US012726433B2

(12) United States Patent
Hu et al.

(10) Patent No.: US 12,726,433 B2
(45) Date of Patent: Sep. 1, 2026

(54) SERVICE PROCESSING METHOD, APPARATUS, DEVICE, AND SYSTEM

(71) Applicant: Huawei Technologies Co., Ltd., Shenzhen (CN)

(72) Inventors: Ruizhao Hu, Beijing (CN); Shuping Peng, Beijing (CN); Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 18/309,142

(22) Filed: Apr. 28, 2023

(65) Prior Publication Data

US 2023/0275829 A1 Aug. 31, 2023

Related U.S. Application Data

(63) Continuation of application No. PCT/CN2021/104123, filed on Jul. 2, 2021.

(30) Foreign Application Priority Data

Oct. 30, 2020 (CN) ......................... 202011192392.8

(51) Int. Cl.
*H04L 45/302* (2022.01)
*H04L 45/00* (2022.01)
*H04L 45/02* (2022.01)

(52) U.S. Cl.
CPC ............ *H04L 45/306* (2013.01); *H04L 45/04* (2013.01); *H04L 45/34* (2013.01)

(58) Field of Classification Search
CPC ...... H04L 67/1097; H04L 43/10; G06F 13/22
See application file for complete search history.

(56) References Cited

U.S. PATENT DOCUMENTS 11,032,389 B1 * 6/2021 Chaubey ............. H04W 40/246
11,882,037 B2 * 1/2024 Gu .......................... H04L 45/74
(Continued)

FOREIGN PATENT DOCUMENTS

CN 111049757 A 4/2020
CN 111211981 A 5/2020
(Continued)

OTHER PUBLICATIONS

Z. Li, et al, "Application-aware IPV6 Networking (APN6) Encapsulation draft-li-6man-app-aware-ipv6-network-02", Jul. 4, 2020, 13 pages.

(Continued)

*Primary Examiner* — Dhairya A Patel
(74) *Attorney, Agent, or Firm* — Slater Matsil, LLP

(57) ABSTRACT

A service processing method, apparatus, device, and system. The method includes receiving, by a first network device, a first service packet including a destination address and first application feature information, where the first application feature information represents a related feature of a first application, and the first service packet belongs to the first application, and determining a first forwarding policy based on the destination address and the first application feature information that are carried in the first service packet, and forwarding the first service packet according to the first forwarding policy.

20 Claims, 14 Drawing Sheets

| Service level agreement level SLA level | Application identifier APP ID | User identity user ID | Flow identifier flow ID |
|---|---|---|---|

(56) References Cited

U.S. PATENT DOCUMENTS

| | | | | |
|---|---|---|---|---|
| 2002/0021675 | A1* | 2/2002 | Feldmann | H04L 45/00 370/254 |
| 2014/0331280 | A1* | 11/2014 | Porras | H04L 63/20 726/1 |
| 2019/0045409 | A1* | 2/2019 | Rasanen | H04W 88/16 |
| 2020/0162431 | A1* | 5/2020 | Goldschlag | H04L 9/3218 |
| 2021/0409315 | A1 | 12/2021 | Peng et al. | |
| 2022/0255862 | A1* | 8/2022 | Wu | H04L 45/50 |
| 2025/0141787 | A1* | 5/2025 | Chen | H04L 45/34 |

FOREIGN PATENT DOCUMENTS

| | | | | |
|---|---|---|---|---|
| CN | 111600929 | A | 8/2020 | |
| EP | 3562109 | A1 | 10/2019 | |
| WO | WO-2020182150 | A1 * | 9/2020 | H04L 45/306 |

OTHER PUBLICATIONS

M. Koldychev et al., "PCEP extension to support Segment Routing Policy Candidate Paths draft-ietf-pce-segment-routing-policy-cp-00", Jun. 24, 2020, 20 pages.

S. Previdi et al., "Advertising Segment Routing Policies in BGP draft-ietf-idr-segment-routing-te-policy-08", Nov. 18, 2019, 38 pages.

Cisco, "Segment Routing Configuration Guide, Chapter: Segment Routing on Demand Next Hop for L3/L3VPN", Aug. 1, 2017, 11 pages, URL:https://www.cisco.com/c/en/us/td/docs/ios-XML/ios/seg_routing/configuration/xe-16/segrt-xe-16-book/segrt-xe-16-book_chapter_0111.html.

* cited by examiner

| Service level agreement level SLA level | Application identifier APP ID | User identity user ID | Flow identifier flow ID |
| --- | --- | --- | --- |

FIG. 1

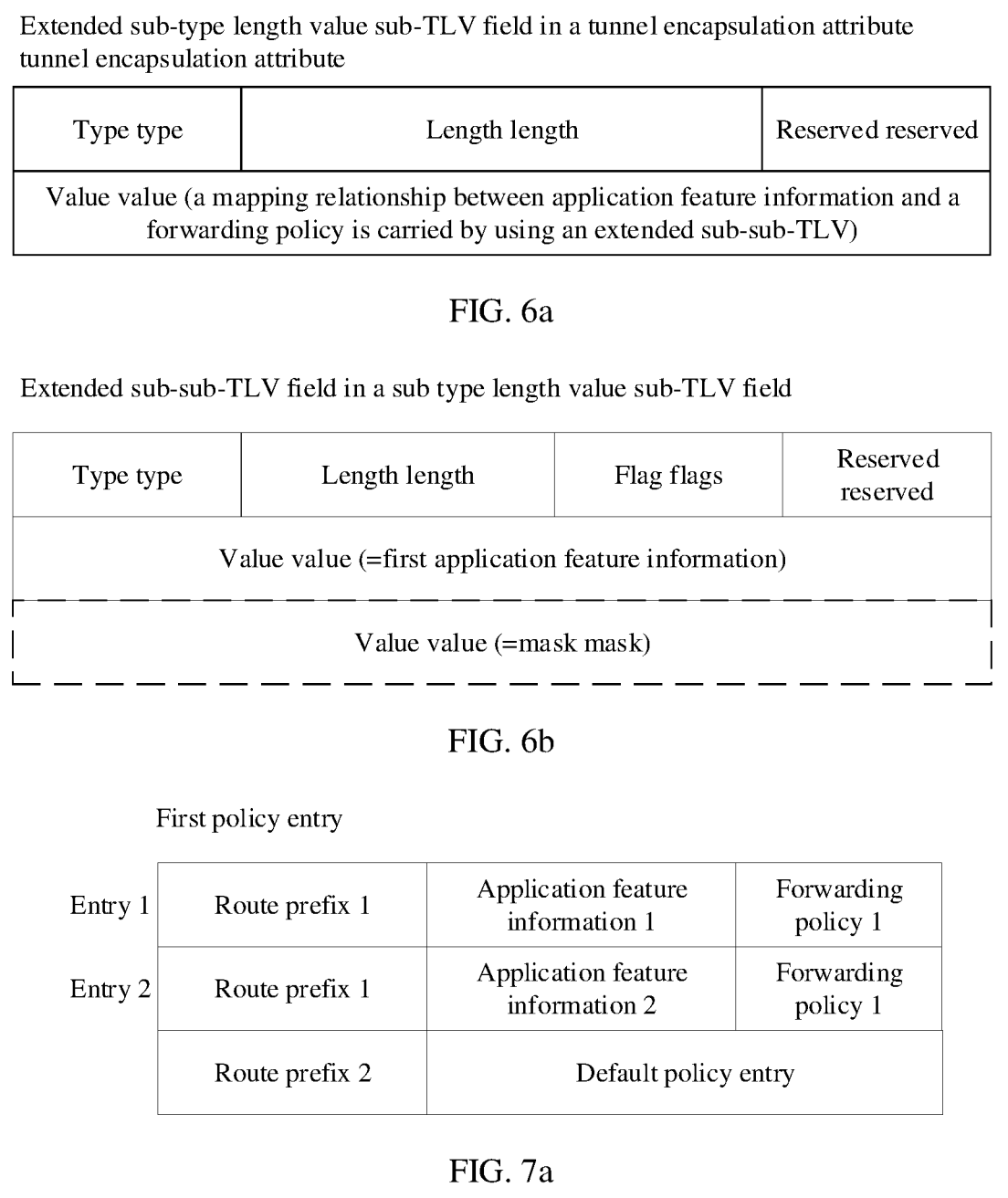

Extended sub-type length value sub-TLV field in a tunnel encapsulation attribute tunnel encapsulation attribute

| Type type | Length length | Reserved reserved |
|---|---|---|
| Value value (a mapping relationship between application feature information and a forwarding policy is carried by using an extended sub-sub-TLV) | | |

FIG. 6a

Extended sub-sub-TLV field in a sub type length value sub-TLV field

| Type type | Length length | Flag flags | Reserved reserved |
|---|---|---|---|
| Value value (=first application feature information) | | | |
| Value value (=mask mask) | | | |

FIG. 6b

First policy entry

| | | | |
|---|---|---|---|
| Entry 1 | Route prefix 1 | Application feature information 1 | Forwarding policy 1 |
| Entry 2 | Route prefix 1 | Application feature information 2 | Forwarding policy 1 |
| | Route prefix 2 | Default policy entry | |

FIG. 7a

Policy entry

| | | | | |
|---|---|---|---|---|
| Entry 3 | Route prefix 1 | Identifier 1 of a policy entry group | Application feature information 1 | Forwarding policy 1 |
| Entry 4 | Route prefix 1 | Identifier 1 of a policy entry group | Application feature information 2 | Forwarding policy 1 |
| | Route prefix 2 | Default policy entry | | |

FIG. 7b

Policy entry

Policy entry 3

| | | |
|---|---|---|
| Entry 5 | Application feature information 1 | Forwarding policy 1 |
| Entry 6 | Application feature information 2 | Forwarding policy 1 |
| | Default policy entry | |

Policy entry 2

| | |
|---|---|
| Route prefix 1 | Identifier 1 of a policy entry 3 |

FIG. 7c

First policy entry

| | | | | |
|---|---|---|---|---|
| Entry 1 | Route prefix 1 | Application feature information 1 (or application feature information 2) | Mask mask 1 | Forwarding policy 1 |

FIG. 8a

Policy entry

| | | | | | |
|---|---|---|---|---|---|
| Entry 3 | Route prefix 1 | Identifier 1 of a policy entry group | Application feature information 1 (or application feature information 2) | Mask mask 1 | Forwarding policy 1 |

FIG. 8b

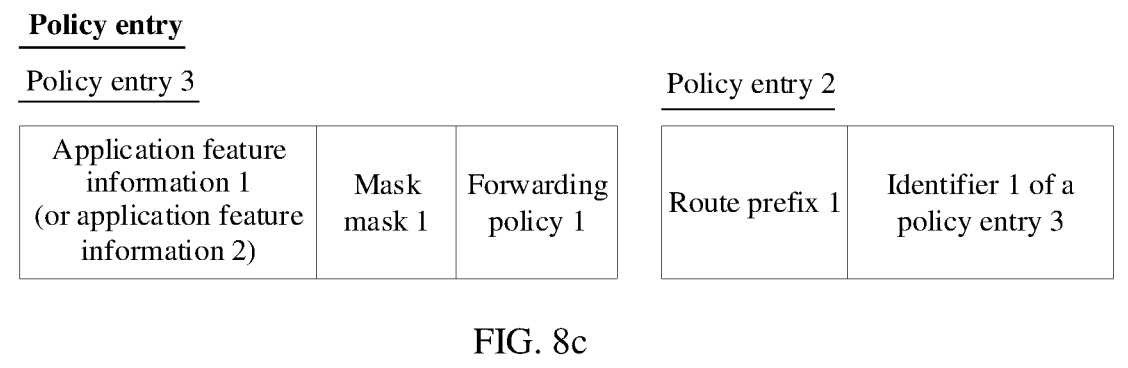

Policy entry

Policy entry 3

| Application feature information 1 (or application feature information 2) | Mask mask 1 | Forwarding policy 1 |
| --- | --- | --- |

Policy entry 2

| Route prefix 1 | Identifier 1 of a policy entry 3 |
| --- | --- |

FIG. 8c

SERVICE PROCESSING METHOD, APPARATUS, DEVICE, AND SYSTEM

CROSS-REFERENCE TO RELATED APPLICATIONS

This application is a continuation of International Application No. PCT/CN2021/104123, filed on Jul. 2, 2021, which claims priority to Chinese Patent Application No. 202011192392.8, filed on Oct. 30, 2020. The disclosures of the aforementioned applications are hereby incorporated by reference in their entireties.

TECHNICAL FIELD

This application relates to the field of communication technologies, and in particular, to a service processing method, apparatus, device, and system.

BACKGROUND

With development of communication technologies, emerging applications bring convenience to work and life of users. A user may have different requirements for different applications. For example, a requirement for network performance of an application A (for example, a game) is higher, and a requirement for network performance of an application B (for example, an email) is lower. At present, user-level coarse-grained differentiation control is supported for a service packet. That is, a network device can sense a user to which a received service packet belongs, and perform corresponding processing based on the service packet corresponding to the user. However, application-level refined service processing required by a user cannot be properly deployed and implemented currently. For example, a network device diverts a service packet A corresponding to the application A to a forwarding path 1 that can meet a higher network performance requirement, and diverts a service packet B corresponding to the application B to a forwarding path 2 that can meet a lower network performance requirement.

Based on this, currently, a service processing technical solution needs to be urgently provided, so as to meet a requirement of a user for application-level refined service processing.

SUMMARY

Embodiments of this application provides a service processing method, apparatus, device, and system. Provided that a service packet carries application feature information, the network device can sense a specific application corresponding to the service packet, and accurately forward the service packet according to a forwarding policy corresponding to the application feature information. In this way, application-level service processing of a user is met, and user experience is improved.

According to a first aspect, an embodiment of this application provides a service processing method. The method is applied to a first network device. For example, the method may include: A first network device receives a first service packet including a destination address and first application feature information, where the first application feature information is used to represent a related feature of a first application, and the first service packet belongs to the first application; and subsequently, the first network device determines a first forwarding policy based on the destination address and the first application feature information that are carried in the first service packet, and forwards the first service packet according to the first forwarding policy. It can be learned that according to the method, provided that a service packet carries application feature information, a network device can sense a specific application corresponding to the service packet, search for a forwarding policy corresponding to the application feature information of the application, and accurately forward the service packet according to the determined forwarding policy, so that it is possible to provide application-level service processing for a user, thereby improving user experience.

In some possible implementations, the first network device may store a first policy entry. The first policy entry includes a correspondence between a route prefix, the first application feature information, and the first forwarding policy. In this case, for example, that the first network device determines a first forwarding policy based on the destination address and the first application feature information may include: The first network device determines that the destination address in the first service packet matches the route prefix in the first policy entry and the first application feature information in the first service packet matches first application feature information in the first policy entry, and obtains the first forwarding policy from the first policy entry. In this way, because the first policy entry includes relatively rich content, a process of forwarding a service packet by the first network device can be implemented by viewing the first policy entry only once, thereby reducing resources consumed by table lookup in the packet forwarding process, and improving packet forwarding efficiency.

In some other possible implementations, the first network device may further store a second policy entry and a third policy entry. The second policy entry stores a correspondence between a route prefix and an identifier of the third policy entry. The third policy entry stores a correspondence between the first application feature information and the first forwarding policy. In this case, for example, that the first network device determines a first forwarding policy based on the destination address and the first application feature information may include: The first network device determines that the destination address in the first service packet matches the route prefix in the second policy entry; the first network device determines the third policy entry based on the identifier of the third policy entry included in the second policy entry; and the first network device determines application feature information in the third policy entry matches application feature information included in the first service packet, and obtains the first forwarding policy from the third policy entry. The method provided in this embodiment of this application may further include a process of generating the second policy entry. In an example, that the first network device generates the second policy entry may include: The first network device receives a route advertisement packet sent by a second network device, where the route advertisement packet includes the route prefix and an address of the second network device; the first network device matches a fourth policy entry based on the address of the second network device, where the fourth policy entry includes a correspondence between the address of the second network device and the identifier of the third policy entry; and the first network device generates the second policy entry based on the fourth policy entry. The route advertisement packet may further include an application-aware internet protocol version 6 networking (APN6) identifier. The APN6 identifier is used to indicate to process a service packet from the first network device to the second network device according to an APN6 rule, or it may be considered that the APN6 identifier is used to indicate to process a service packet from the first network device to the second network device according to a policy entry stored the first network device. In this way, a forwarding policy of a to-be-forwarded service packet is determined by using two sequential table lookup processes, so that application-level accurate service processing can be implemented.

The route prefix may include an internet protocol prefix (IP Prefix).

The route advertisement packet may be a first border gateway protocol (BGP) packet. The first BGP packet carries an APN6 identifier by using an extended address family, or the first BGP packet carries an APN6 identifier by using a newly added path attribute, or the first BGP packet carries an APN6 identifier by using a color field in an extended community attribute.

In some possible implementations, the method may further include a process in which the first network device computes a first forwarding policy based on the first application feature information. That is, the method may further include: The first network device computes a forwarding path from the first network device to the second network device based on the first application feature information, and the first network device generates the first forwarding policy based on the forwarding path. In this way, when the first network device has a path computation function, the first network device can independently compute a forwarding policy of application feature information.

In some other possible implementations, the method may further include a process in which the first network device receives the first forwarding policy corresponding to the first application feature information from a controller. That is, the method may further include: The first network device receives the first forwarding policy sent by the controller. In this way, when the controller has a path computation function, the first network device may not need to perform path computation autonomously, but to directly receive the forwarding policy of the application feature information from the controller.

In an example, that the first network device receives the first forwarding policy sent by the controller may include: The first network device receives a BGP packet sent by the controller, where the second BGP packet carries the first forwarding policy by using an extended type length value TLV field in a tunnel encapsulation attribute tunnel encapsulation attribute.

In another example, that the first network device receives the first forwarding policy sent by the controller may include: The first network device receives a first path computation element protocol (PCEP) packet sent by the controller, where the first PCEP packet carries the first forwarding policy by using an extended TLV field in a segment routing policy association group association object (SRPAG ASSOCIATION object).

In this implementation, in one case, the controller may perform path computation autonomously and actively deliver the first forwarding policy to the first network device. In another case, the first network device may request the controller to perform path computation, and the controller responds to the request to perform path computation passively and deliver the first forwarding policy. That is, before the first network device receives the first forwarding policy sent by the controller, the method may further include: The first network device sends a request packet to the controller, where the request packet includes the first application feature information, and the request packet is used to request the controller to determine the first forwarding policy from the first network device to the second network device. The request packet may be a third BGP packet, and the third BGP packet carries the first application feature information by using an extended type length value TLV field in a tunnel encapsulation attribute. Alternatively, the request packet may be a second PCEP packet, and the second PCEP packet carries the first application feature information by using an extended TLV field in an SRPAG ASSOCIATION object.

That the first network device sends a request packet to the controller may specifically include: If the first network device determines that no first forwarding policy matching the first application feature information in the received route advertisement packet exists, the first network device sends the request packet to the controller, where the route advertisement packet is a fourth BGP packet, and the fourth BGP packet carries the first application feature information by using a path attribute.

In some possible implementations, to save resources, the first policy entry stored in the first network device may further include a mask mask. The mask is used to indicate valid information (that is, a set of bits that need to be matched) in the first application feature information. For example, that the first network device determines that the first application feature information in the first service packet matches first application feature information in the first policy entry may include: The first network device determines that information specified by the mask in the first application feature information in the first service packet matches the information specified by the mask in the first application feature information in the first policy entry.

In some other possible implementations, to save resources, the third policy entry stored in the first network device may further include a mask mask. The mask is used to indicate valid information in the first application feature information. For example, that the first network device determines that the first application feature information in the third policy entry matches the application feature information included in the first service packet may include: The first network device determines that information specified by the mask in the first application feature information in the first service packet matches information specified by the mask in the first application feature information in the third policy entry.

The mask may include a subnet mask. Alternatively, the mask may include a character string in which valid bits are not consecutive.

In some possible implementations, to enable the method to be applicable to processing of a service packet whose application feature information fails to be matched, the method may further include: The first network device receives a second service packet, where the second service packet includes a destination address and second application feature information, the second application feature information is used to represent a related feature of a second application, and the second service packet belongs to the second application; and if the first network device matches no forwarding policy based on the destination address and the second application feature information, the first network device forwards the second service packet according to a default policy entry. In an example, when the default policy entry includes an identifier of the second network device, that the first network device forwards the second service packet according to the default policy entry includes: The first network device computes a path to the second network device; and the first network device forwards the second service packet based on path information corresponding to the path. In another example, when the default policy entry includes a second forwarding policy, that the first network device forwards the second service packet according to the default policy entry includes: The first network device forwards the second service packet according to the second forwarding policy in the default policy entry. In this way, in this embodiment of this application, not only the service packet that successfully matches the application feature information can be forwarded, but also the service packet that does not match the application feature information can be effectively forwarded, so that the service packet processing method is more perfect.

The first forwarding policy may include a segment identifier list SID list corresponding to a forwarding path. A forwarding policy in the foregoing policy entry may be an identifier corresponding to the forwarding policy. The identifier of the forwarding policy may include, for example, an identifier of a head node, an identifier of a tail node, and color.

The first application feature information may include at least a service level of the first application. In addition, the first application feature information further includes at least one of the following identifiers: an identifier of the first application, an identifier of a user or a user group to which the first application belongs, and a flow identifier of the first application.

In this embodiment of this application, the first network device for implementing the method may be an ingress provider edge PE device of a network, a device corresponding to a destination address is a service server, and the service server is configured to provide a service for the first application; or the first network device may be an egress provider edge PE device of a network, a device corresponding to a destination address is a CE device (such as user equipment) connected to an ingress PE device, and the CE device connected to the ingress PE device carries the first application.

According to a second aspect, an embodiment of this application further provides a service processing method. The method is applied to a first network device. For example, the method may include: The first network device obtains a correspondence between application feature information and a forwarding policy, where the application feature information is used to represent a related feature of an application; the first network device receives a route advertisement packet from a second network device, where the route advertisement packet includes a route prefix and an address of the second network device; and the first network device generates a policy entry based on the route advertisement packet and the correspondence between the application feature information and the forwarding policy, where the policy entry is used to indicate the first network device to send a service packet corresponding to the application to the second network device. It can be learned that the method provides a prerequisite for accurately forwarding a service packet by the first network device to the second network device and implementing application-level service processing, so that it is possible to provide application-level service processing for a user, thereby improving user experience.

In some possible implementations, for example, that the first network device generates a policy entry based on the route advertisement packet and the correspondence between the application feature information and the forwarding policy may include: The first network device generates a first policy entry based on the route advertisement packet and the correspondence between the application feature information and the forwarding policy, where the first policy entry includes the correspondence between the route prefix, the application feature information, and the forwarding policy. In this implementation, this embodiment of this application may further include processing of a service packet. That is, the method may further include: The first network device receives a service packet including a destination address and application feature information, where the service packet belongs to an application; the first network device determines that the destination address in the service packet matches the route prefix in the first policy entry and the application feature information in the service packet matches the application feature information in the first policy entry; and the first network device forwards the service packet according to the forwarding policy in the first policy entry. In this way, because the first policy entry includes relatively rich content, a process of forwarding a service packet by the first network device can be implemented by viewing the first policy entry only once, thereby reducing resources consumed by table lookup in the packet forwarding process, and improving packet forwarding efficiency.

In some other possible implementations, the policy entry generated the first network device may include a second policy entry and a third policy entry. In this case, for example, that the first network device generates a policy entry based on the route advertisement packet and the correspondence between the application feature information and the forwarding policy may include: The first network device generates the third policy entry, where the third policy entry stores the correspondence between the application feature information and the forwarding policy; and the first network device matches a fourth policy entry based on the address of the second network device, and generates the second policy entry based on the fourth policy entry, where the fourth policy entry includes a correspondence between the address of the second network device and an identifier of the third policy entry, and the second policy entry stores a correspondence between the route prefix and the identifier of the third policy entry. In this implementation, this embodiment of this application may further include processing of a service packet. That is, the method may further include: The first network device receives a service packet including a destination address and application feature information, where the service packet belongs to an application; the first network device determines that the destination address in the service packet matches the route prefix in the second policy entry; the first network device determines the third policy entry based on the identifier of the third policy entry included in the second policy entry; subsequently, the first network device determines that the application feature information in the third policy entry matches application feature information included in the service packet; and the first network device forwards the service packet according to the forwarding policy in the third policy entry. In this way, a forwarding policy of a to-be-forwarded service packet is determined by using two sequential table lookup processes, so that application-level accurate service processing can be implemented.

According to a third aspect, a first network device is provided, and is configured to perform the method according to any one of the first aspect or the possible designs of the first aspect. Specifically, the first network device includes a unit configured to perform the method according to any one of the first aspect or the possible designs of the first aspect. Alternatively, the first network device is configured to perform the method according to any one of the second aspect or the possible designs of the second aspect, and the first network device includes a unit configured to perform the method according to any one of the second aspect or the possible designs of the second aspect.

According to a fourth aspect, a network device is provided. The network device is applied to a network system including a plurality of network devices. The plurality of network devices include a first network device and a second network device. The network device is the first network device. The first network device includes a processor and a network interface. The network interface is configured to receive and send a packet. The processor is configured to perform the method according to any one of the first aspect or the possible designs of the first aspect; or the processor is configured to perform the method according to any one of the second aspect or the possible designs of the second aspect.

In a possible design, the first network device further includes a memory, and the memory may be configured to store instructions or program code. The processor is configured to invoke the instructions or program code in the memory to perform the method according to any one of the first aspect or the possible designs of the first aspect; or the processor is configured to invoke the instructions or program code in the memory to perform the method according to any one of the second aspect or the possible designs of the second aspect.

According to a fifth aspect, a service processing system is provided. The system may include a first network device and a second network device. The first network device is configured to receive a service packet including a destination address and application feature information, where the application feature information is used to represent a related feature of an application, and the service packet belongs to the application. The first network device is further configured to: determine a forwarding policy based on the destination address and the application feature information, and forward the service packet to the second network device according to the forwarding policy. The second network device is configured to: receive the service packet, and send the service packet to a destination device corresponding to the destination address.

In some possible implementations, the service processing system may further include a service server and a management server. The service server is configured to send a request packet to the management server, where the request packet includes an application identifier and a service level requirement. The management server is configured to: receive the request packet sent by the service server, allocate, to an application corresponding to the application identifier, a service level meeting the service level requirement, generate the application feature information, and send the application feature information to the service server, where the application feature information includes the allocated service level. In this case, the service server is further configured to send the application feature information to user equipment.

In an example, the service processing system may further include a controller. The management server is further configured to send the application feature information to the controller. In this case, the controller is configured to: generate the forwarding policy based on the application feature information, and send a correspondence between the application feature information and the forwarding policy to the first network device.

In another example, the service processing system may further include a controller. The management server is further configured to send the application feature information to the controller. The controller is configured to: receive the application feature information, and send the application feature information to the first network device. The first network device is further configured to: generate the forwarding policy based on the application feature information, and correspondingly save the application feature information and the forwarding policy.

It should be noted that the first network device included the service processing system may be the first network device provided in any one of the foregoing aspects.

According to a sixth aspect, a computer-readable storage medium is provided. The computer-readable storage medium includes instructions, a program, or code. When the instructions, the program, or the code is executed on a computer, the computer is enabled to perform the method according to any one of the foregoing aspects.

According to a seventh aspect, a computer program product including computer instructions is provided. When the computer program product runs on a network device, so that the network device performs the method provided in any one of the foregoing aspects.

According to an eighth aspect, a chip is provided, including a memory and a processor. The memory is configured to store instructions or program code. The processor is configured to: invoke the instructions or program code from the memory and run the instructions or program code to perform the method provided in any one of the foregoing aspects or the method in any possible design of any one of the foregoing aspects.

In a possible design, the chip includes only a processor. The processor is configured to read and execute the instructions or program code stored in the memory. When the instructions or the program code is executed, the processor performs the method provided in any one of the foregoing aspects or the method in any possible design of any one of the foregoing aspects.

BRIEF DESCRIPTION OF THE DRAWINGS

FIG. 1 is a schematic diagram of a format of application feature information according to an embodiment of this application;

FIG. 6*a* is a schematic diagram of a format of a TLV carrying a mapping relationship in a second BGP packet according to an embodiment of this application;

FIG. 6*b* is a schematic diagram of a format of an extended Sub-sub-TLV field in a value field shown in FIG. 6*a* according to an embodiment of this application;

FIG. 7*a* is a schematic diagram of a format of an APN6 forwarding rule according to an embodiment of this application;

FIG. 7b is a schematic diagram of a format of another APN6 forwarding rule according to an embodiment of this application;

FIG. 7c is a schematic diagram of a format of still another APN6 forwarding rule according to an embodiment of this application;

FIG. 8a is a schematic diagram of a format of an APN6 forwarding rule including a mask according to an embodiment of this application;

FIG. 8b is a schematic diagram of a format of another APN6 forwarding rule including a mask according to an embodiment of this application;

FIG. 8c is a schematic diagram of a format of still another APN6 forwarding rule including a mask according to an embodiment of this application;

DETAILED DESCRIPTION OF ILLUSTRATIVE EMBODIMENTS

Figure 2:
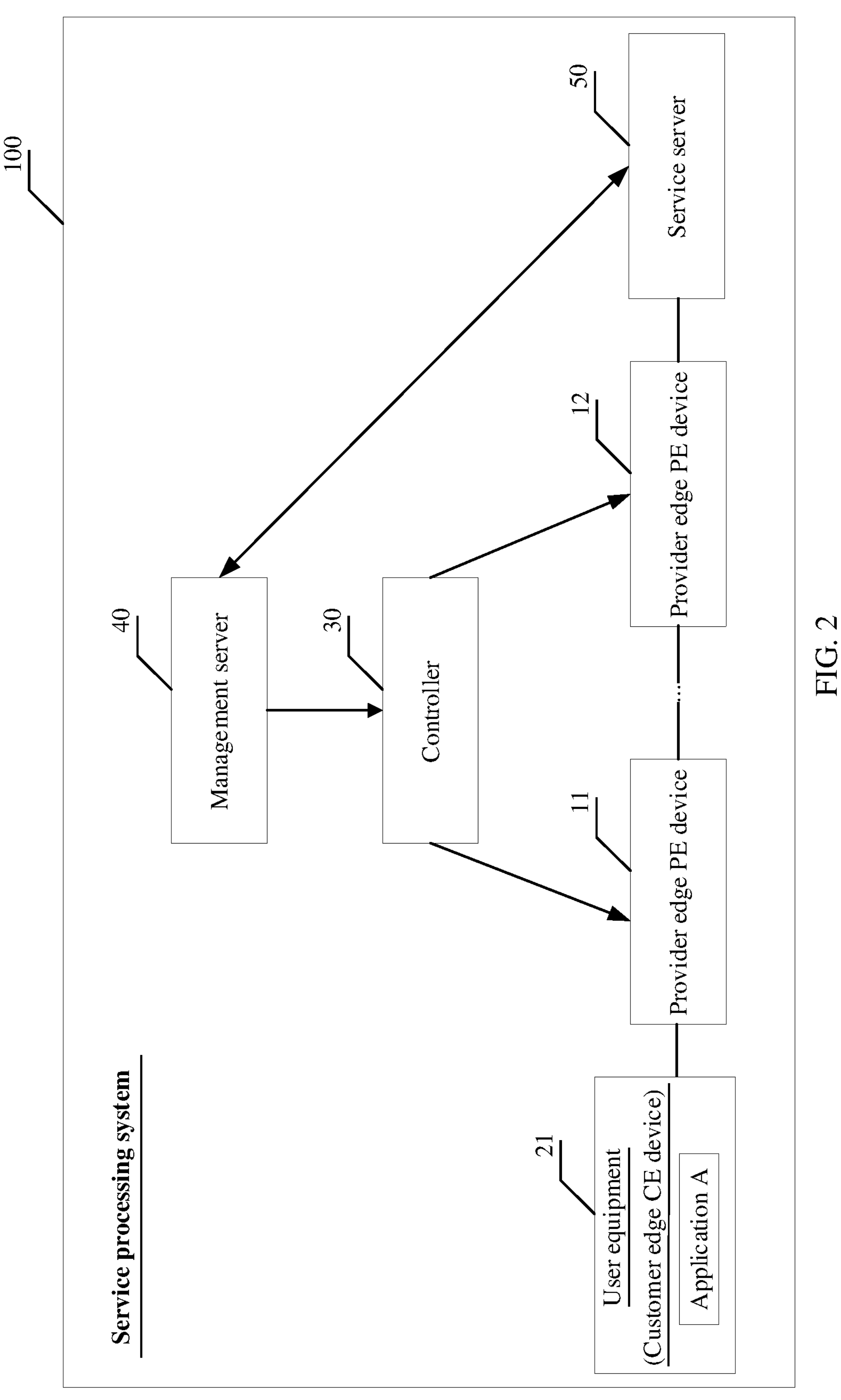
FIG. 2 is a schematic diagram of a structure of a service processing system 100 according to an embodiment of this application.

The following describes technical solutions in embodiments of this application with reference to the accompanying drawings. A network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of new service scenarios, the technical solutions provided in embodiments of this application are also applicable to similar technical problems.

Ordinal numbers such as "1", "2", "3", "first", "second", and "third" in embodiments of this application are used to distinguish between a plurality of objects, but are not used to limit a sequence of the plurality of objects.

"A and/or B" mentioned in embodiments of this application should be understood as including the following cases: Only A is included, only B is included, or both A and B are included.

In a segment routing over internet protocol version 6 (SRv6) or segment routing over multiprotocol label switching (SR MPLS) scenario, traffic engineering (TE) policy traffic diversion means that a head node of the SRv6 or SR MPLS imports traffic into a corresponding path that can ensure a service level agreement (SLA) requirement of the traffic. The traffic diversion technology includes color traffic diversion and differentiated services code point (DSCP) traffic diversion.

In color traffic diversion, the head node of the SRv6 or SR MPLS receives a TE policy delivered by the controller, and the TE policy includes at least a color, an endpoint, and a segment list. The head node further receives a routing message sent by a tail node of the SRv6 or SR MPLS, and the routing message carries a routing prefix, a color, and a nexthop. The head node of the SRv6 or SR MPLS determines that a value of the color in the TE policy is the same as a value of a color in the routing message and that a node indicated by an endpoint in the TE policy is a node indicated by a nexthop in the routing message. In this case, the head node generates a forwarding entry, and the forwarding entry includes a mapping relationship between an IP prefix and a segment list. In this way, when receiving a service packet whose color value is the same as the foregoing two color values, the head node may determine a matched forwarding entry based on a destination address in the service packet, and perform forwarding based on a segment list in the matched forwarding entry. However, in the color traffic diversion method, a route prefix in a routing message can correspond to only one SLA requirement, and cannot reflect different SLA requirements. That is, differentiated SLA assurance cannot be obtained, by using the color traffic diversion method, for a plurality of different applications that have different SLA requirements. In addition, for an application whose SLA requirement frequently changes, when the color traffic diversion method is used, a color value in a routing message needs to be constantly modified, resulting in poor user experience.

In DSCP traffic diversion, the head node of the SRv6 or SR MPLS receives a TE policy delivered by the controller. The TE policy includes at least a color, an endpoint, and a segment list. The head node further receives a routing message sent by a tail node of the SRv6 or SR MPLS. The routing message carries an IP prefix and a nexthop. In addition, the head node maps the color in the TE policy to a DSCP value. The head node of the SRv6 or SR MPLS generates a forwarding entry, and the forwarding entry includes a mapping relationship between the IP prefix, the DSCP, and the segment list. In this way, when receiving a service packet, the head node may determine a matched forwarding entry based on the destination address in the service packet, calculate a DSCP value based on a feature of the service packet, match the calculated DSCP value with a DSCP value in the matched forwarding entry, and forward the service packet based on a segment list in the finally matched forwarding entry. However, in the DSCP traffic diversion method, because a DSCP field in the TE policy has only six bits, a maximum of 64 different TE policies are included. In addition, the head node of the SRv6 or SR MPLS needs to calculate a DSCP value for each received service packet based on feature information of the service packet, and perform traffic diversion based on the calculated DSCP value. A process is complex and deployment is difficult. Furthermore, it is further required that SLA requirements of applications can be simply distinguished based on feature information of service packets. As a result, in a scenario in which feature information is the same but SLA requirements of applications to which the feature information belongs are different, application-level service processing cannot be implemented.

Based on this, an embodiment of this application provides a service processing method. A service processing process in the method may include: A first network device obtains a correspondence between application feature information and a forwarding policy; a second network device receives a route advertisement packet; and the first network device generates a policy entry based on the route advertisement packet and the correspondence between the application feature information and the forwarding policy, where the policy entry is used to indicate the first network device to send a service packet corresponding to the application to the second network device. Therefore, when receiving the service packet including a destination address and the application feature information, the first network device may match a corresponding policy entry based on the destination address and the application feature information, and forward the service packet according to a forwarding policy in the matched policy entry. It can be learned that according to the method provided in this embodiment of this application, provided that a service packet carries application feature information, a network device can sense a specific application corresponding to the service packet, and accurately forward the service packet according to a forwarding policy corresponding to the application feature information of the application, so that it is possible to provide application-level service processing for a user, thereby improving user experience.

The following describes some concepts related to embodiments of this application.

Figure 1:
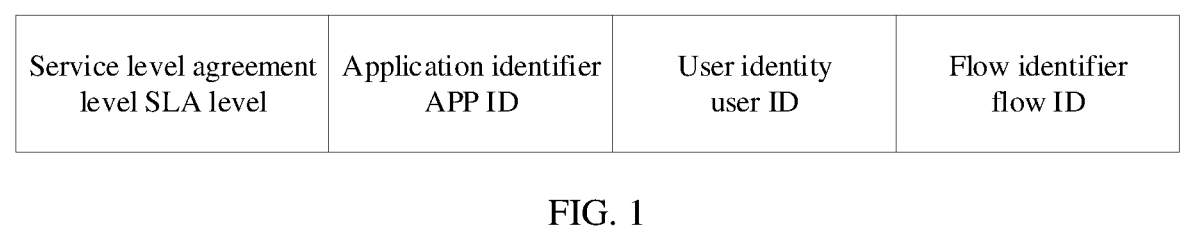

Application feature information (Application-aware ID) is used to represent a related feature of an application. For example, the application feature information may include all or some of the following information: an application identifier (APP ID), a user identity (User ID), a flow identifier (Flow ID) of an application, and a service level of the application. The APP ID is used to uniquely identify a specific application. The application may be an application (for example, Migu, which is a music app) provided by an operator, or may be an application (for example, King of Glory, which is a game) provided by an application provider (Over The Top, OTT). The user ID is used to identify a user or a user group to which the application belongs (for example, identify an important user). The flow ID is used to identify a service flow or a session to which a service packet sent by the application belongs. The service level of the application is used to reflect network performance required by the service packet sent by the application, and may be, for example, a level of a service level agreement (SLA) or an SLA value. In this embodiment of this application, the application-aware ID may include at least an allocated service level, and may further include one or more of the following information based on an actual requirement: an APP ID, a user ID, and a flow ID. In an example, FIG. 1 shows a format of the application feature information. The application feature information may specifically include an SLA level, an APP ID, a user ID, and a flow ID.

A forwarding policy is a basis for performing a forwarding operation on a received service packet. For example, the controller may generate a forwarding policy based on application feature information of an application, and send the forwarding policy to an ingress node (that is, the first network device) of a forwarding path corresponding to the forwarding policy.

A policy entry in a policy table may include a correspondence between a route prefix, application feature information, and a forwarding policy, and is used to record a forwarding policy of a service packet corresponding to an application. Once a destination address and application feature information in the service packet hit a policy entry, forwarding of the service packet may be guided according to a forwarding policy in the hit policy entry. For a representation manner and a corresponding specific format of the policy entry, refer to FIG. 7*a* to FIG. 7*c*, FIG. 8*a* to FIG. 8*c*, and corresponding descriptions.

In one case, the forwarding policy in the policy entry in this embodiment of this application is information that can directly guide service packet forwarding. For example, the forwarding policy in the policy entry may include one or more SID lists corresponding to a forwarding path. In another case, to save resources of the policy entry, the forwarding policy described in the policy entry may also include an identifier (or may be referred to as an index) of the forwarding policy. The first network device may find, based on the identifier of the forwarding policy in the policy entry, a forwarding policy that can directly guide service packet forwarding. In this case, the forwarding policy in the policy entry may include, for example, a source node identifier, a destination node identifier, and a color. A specific forwarding policy is determined from a position of the stored forwarding policy by using the source node identifier, the destination node identifier, and the color. The forwarding policy may include one or more SID lists corresponding to the forwarding path. The source node identifier may be, for example, an IP address of the source node. The destination node identifier may be, for example, an IP address of the destination node. Specifically, if the first network device determines that application feature information in a received service packet hits a policy entry, the first network device may forward the service packet according to a forwarding policy in the policy entry to meet a network performance requirement of an application to which the service packet belongs. The forwarding policy in the following policy entry may be the forwarding policy itself or an identifier of the forwarding policy.

It should be noted that, because each application may include a plurality of different flows, for example, a video stream and an audio stream, flow-level service processing may also be performed on the application according to the service processing method provided in this embodiment of this application. In this case, the application feature information includes a flow ID. A forwarding policy in an APN6 forwarding rule on a first PE device may correspond to an application, or may correspond to a flow or several flows on an application. It should be noted that the flow ID included in the application feature information may be IDs of some specified or important flows in the application. For example, if the application is a game application, the application feature information may include a flow ID corresponding to an action instruction in the game application, so that the first PE device can sense the action instruction and perform corresponding processing on the action instruction. In embodiments of this application, user-level service processing is used as an example for description. An implementation of flow-level service processing of an application is similar to the following implementation of application-level service processing. Details are not described repeatedly in embodiments of this application.

It should be noted that in embodiments of this application, a correspondence between application feature information and a forwarding policy in a policy entry may also be referred to as an application-aware internet protocol version 6 networking (APN6) forwarding policy.

It should be noted that the first network device in embodiments of this application may be, for example, a provider edge (PE) device, and the PE device may be connected to a customer edge (CE) device.

For example, embodiments of this application may be applied to a service processing system 100 shown in FIG. 2. FIG. 2 is a schematic diagram of a structure of the service processing system 100. The service processing system 100 may include a PE device 11, a PE device 12, user equipment 21 (which may also be denoted as a CE 21), a controller 30, a management server 40, and a service server 50 (which may also be denoted as a CE 50). An application A is installed on the user equipment 21. The service server 50 may provide a corresponding service for the application A. The PE device 11 is connected to the user equipment 21 and the PE device 12. The PE device 12 is connected to the service server 50. The service server 50 may communicate with the management server 40. The management server 40 may be connected to the controller 30. The controller 30 is separately connected to the PE device 11 and the PE device 12.

Figure 3A:
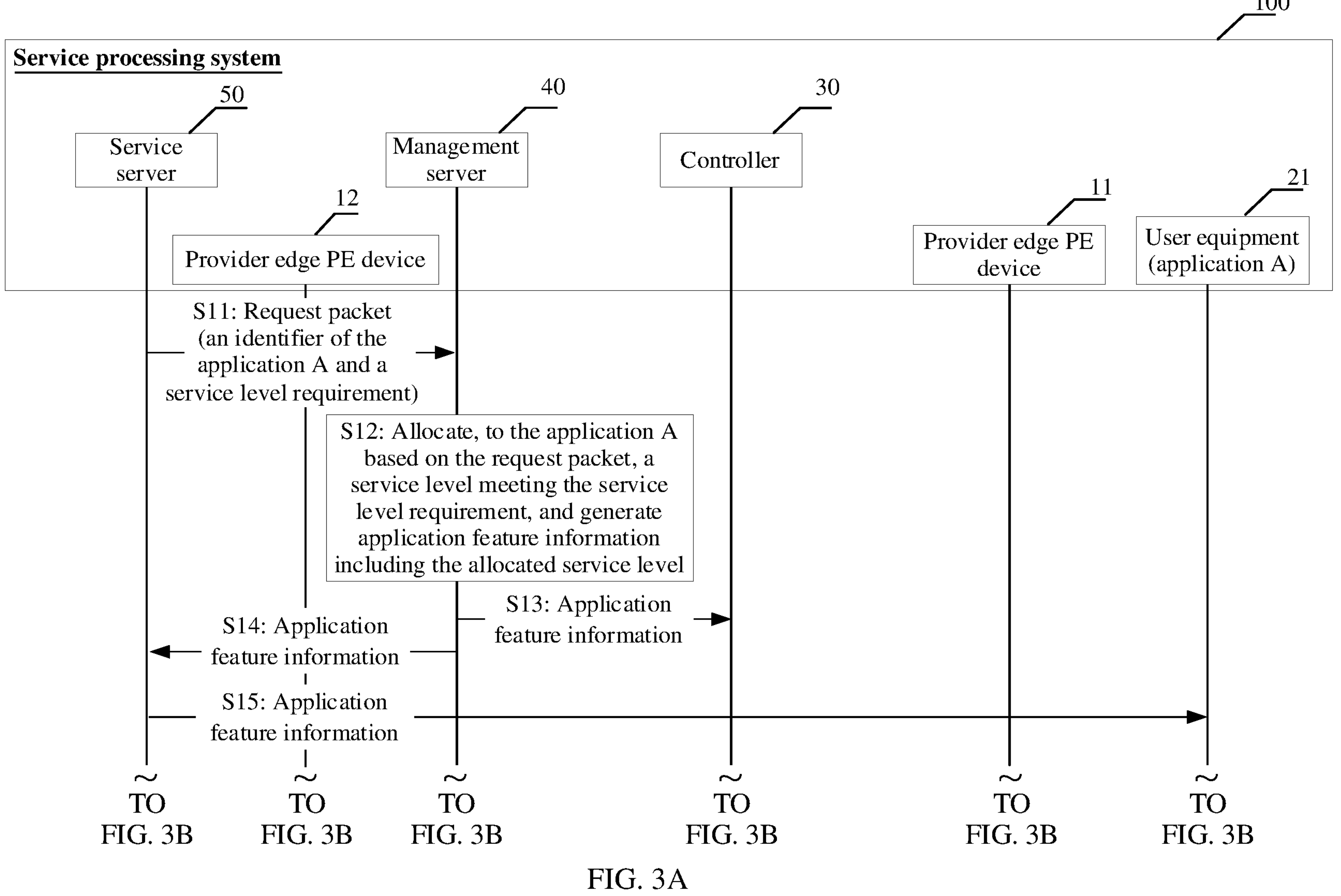
FIG. 3A, FIG. 3B, and FIG. 3C are a schematic flowchart of a service processing process in a service processing system 100 according to an embodiment of this application.
Figure 3B:
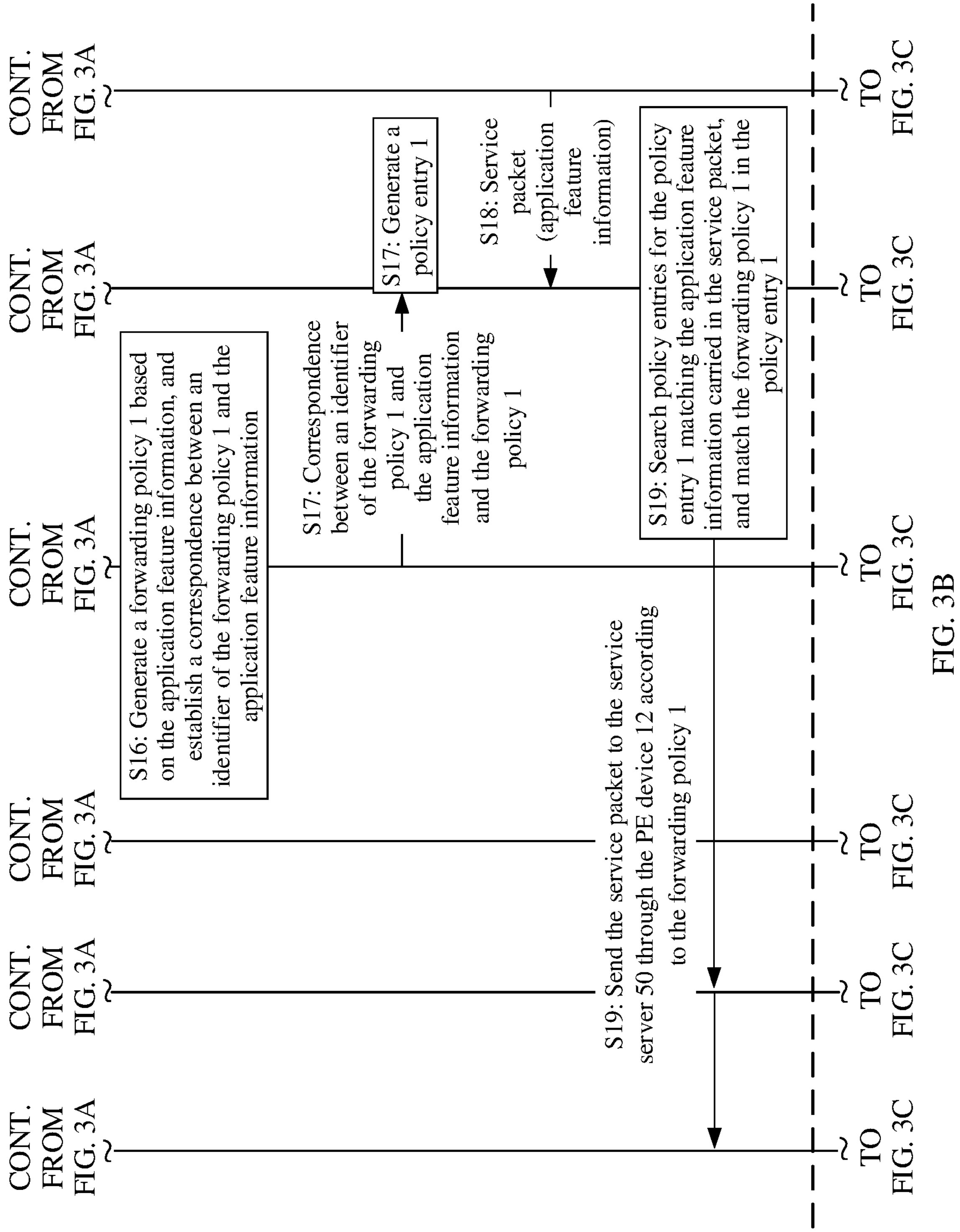
Figure 3C:
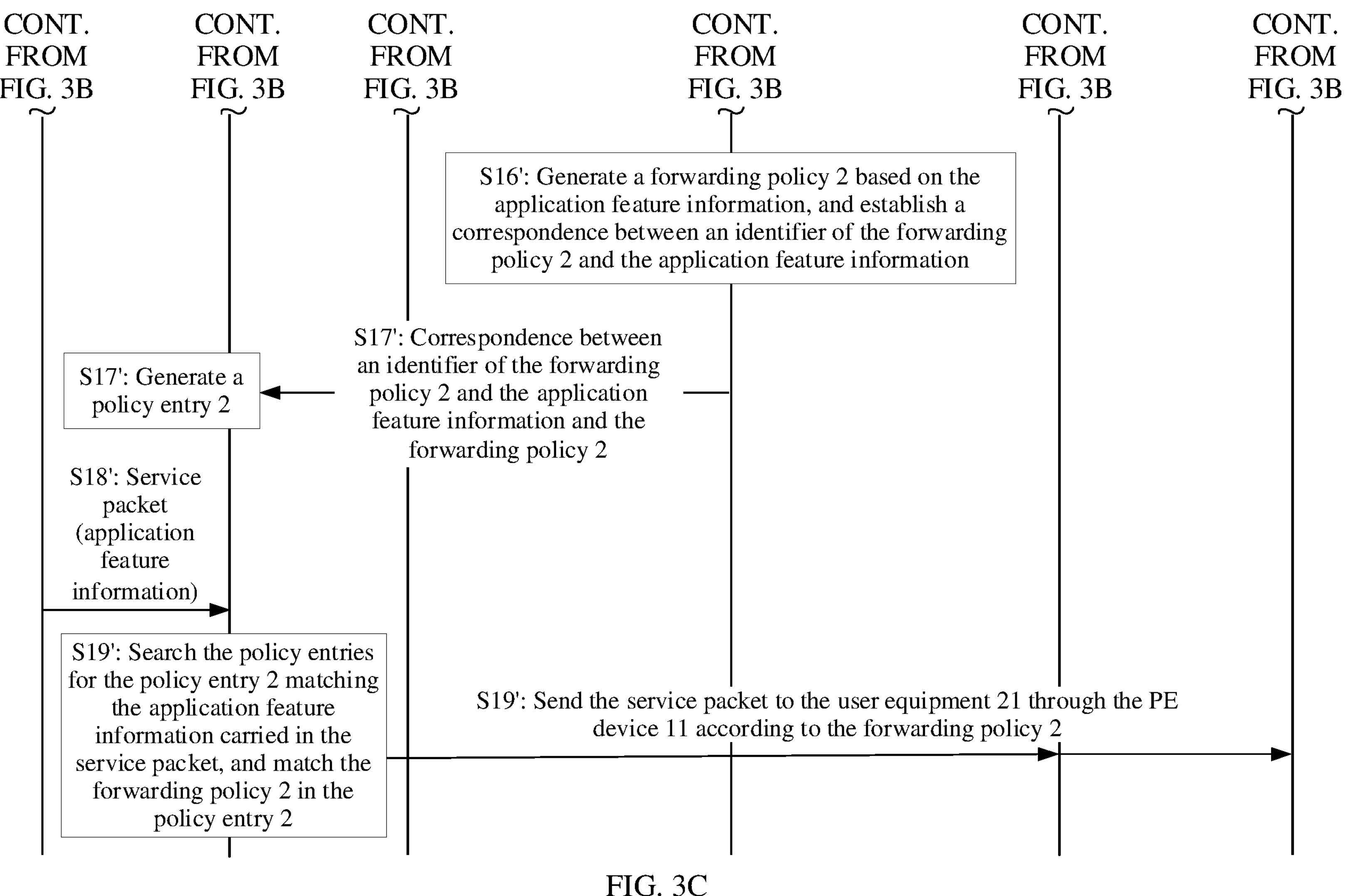

For a service processing process in the service system 100, refer to FIG. 3A, FIG. 3B, and FIG. 3C. For example, processing of a service packet from the user equipment 21 to the service server 50 may include the following steps.

S11: The service server 50 sends a request packet to the management server 40, where the request packet carries an identifier of the application A and a service level requirement.

S12: The management server 40 allocates, to the application A based on the request packet, a service level (referred to as an allocated service level below) meeting the service level requirement, and generates application feature information including the allocated service level.

S13: The management server 40 sends the application feature information to the controller 30.

S14: The management server 40 sends the application feature information to the service server 50.

S15: The service server 50 sends the application feature information to the user equipment 21 to indicate the application A on the user equipment 21 to add the application feature information to a to-be-sent service packet.

S16: The controller 30 generates a forwarding policy 1 based on the application feature information, and establishes a correspondence between an identifier of the forwarding policy 1 and the application feature information, where the forwarding policy 1 is used to indicate to forward a service packet generated by the application A on the user equipment 21.

S17: The controller 30 sends the generated correspondence between the identifier of the forwarding policy 1 and the application feature information and the forwarding policy 1 to the PE device 11, so that the PE device 11 generates a policy entry 1, where the policy entry 1 includes at least the correspondence between a route prefix of the service server 50, the application feature information, and the forwarding policy 1.

S18: The PE device 11 receives the service packet sent by the application A on the user equipment 21, where the service packet includes the application feature information.

S19: The PE device 11 searches policy entries for a policy entry 1 matching the application feature information and a destination address that are carried in the service packet, and sends the service packet to the service server 50 through the PE device 12 according to the forwarding policy 1 in the matched policy entry 1.

There is no limitation on a sequence of performing S15, S16, and S17. It should be noted that S11 may be triggered based on a registration request (or a login request) sent by the user equipment 21 to the service server 50. In this case, for example, S15 may be that the service server 50 adds the application feature information to a response packet of the registration request (or the login request) and feeds back the response packet to the user equipment 21. Alternatively, S11 may be a negotiation actively initiated by the service server 50 before the application goes online. Therefore, before S15, the processing may further include: The user equipment 21 sends a registration request (or a login request) to the service server 50. Correspondingly, S15 may be that the service server 50 adds the application feature information to a response packet of the registration request (or the login request) and feeds back the response packet to the user equipment 21. It should be noted that in S13, if the service level required in the received application feature information cannot be met because of a limitation of a resource after the controller 30 receives the application feature information, path computation may be performed based on a service level allowed by the resource, and the service level allowed by the resource is sent to the management server 40. In this way, the service level included in the application feature information sent by the management server 40 to the service server 50 in S14 may be a service level allowed by the resource of the controller 30.

Similarly, compared with the steps shown in FIG. 3A, FIG. 3B, and FIG. 3C, a difference in a process of processing the service packet from the service server 50 to the user equipment 21 is as follows: S16': The controller 30 generates a forwarding policy 2 based on the application feature information, and establishes a correspondence between an identifier of the forwarding policy 2 and the application feature information, where the forwarding policy 2 is used to indicate to forward a service packet generated on the service server 50. S17': The controller 30 sends the correspondence between the identifier of the generated forwarding policy 2 and the application feature information and the forwarding policy 2 to the PE device 12, so that the PE device 12 generates a policy entry 2, where the policy entry 2 includes at least a correspondence between a route prefix of the user equipment 21, the application feature information, and the forwarding policy 2. S18': The PE device 12 receives the service packet sent by the service server 50, where the service packet includes the application feature information. S19': The PE device 12 searches the policy entries for the policy entry 2 matching the application feature information carried in the service packet, and sends the service packet to the user equipment 21 through the PE device 11 according to the forwarding policy 2 in the matched policy entry 2.

It should be noted that the service server that provides the service corresponding to the application A for a user and the service server that determines, by negotiating with the management server 40, the application feature information corresponding to the application A may be a same service server, or may be two service servers corresponding to the application A. In this embodiment of this application, an example a same service server implements the foregoing two functions is used for description.

It can be learned that, according to the method provided in this embodiment of this application, more refined service processing can be implemented.

Figure 4A:
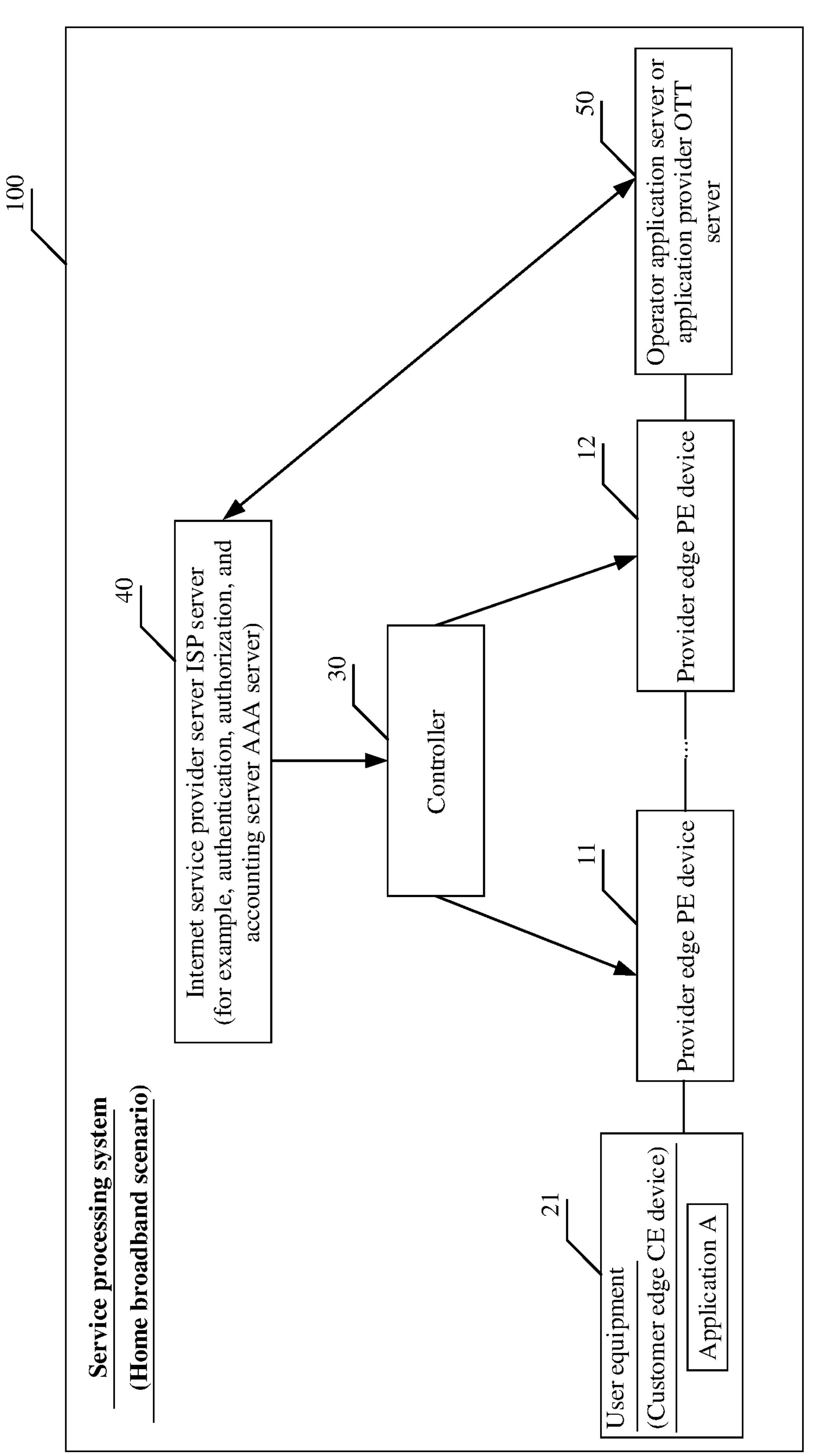
FIG. 4*a* is a schematic diagram of a structure corresponding to a service processing system 100 in a home broadband scenario according to an embodiment of this application.

In an example, the service processing system 100 may correspond to a home broadband scenario. As shown in FIG. 4*a*, in the service processing system 100, the management server 40 may be an internet service provider server (ISP Server) 40, for example, may be an operator authentication, authorization, and accounting (AAA) server 40. The service server 50 may be an operator application server 50 corresponding to an application A, or may be an OTT server 50.

Figure 4B:
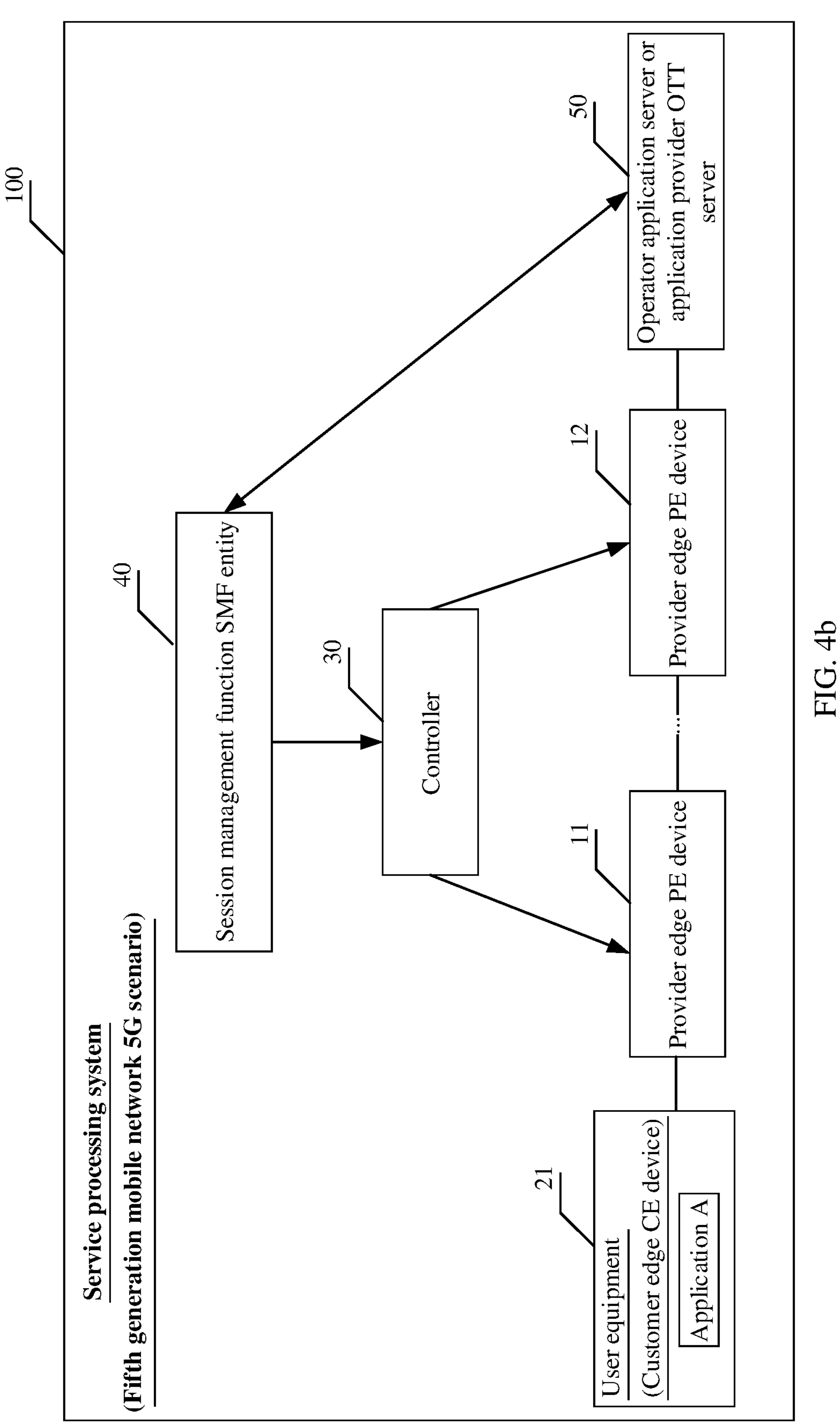
FIG. 4*b* is a schematic diagram of a structure corresponding to a service processing system 100 in a 5G mobile communication scenario according to an embodiment of this application.

In another example, the service processing system 100 may correspond to a mobile communication scenario. A fifth generation mobile network (5G) scenario shown in FIG. 4*b* is used as an example. In the service processing system 100, the management server 40 may be a session management function (SMF) entity 40, and the service server 50 may be an application server 50 of an operator that serves the application A, or may be an OTT server 50.

It should be noted that both the management server 40 and the controller 30 are devices of the operator, and may be specifically two physical devices that establish a communication connection relationship, or may be two functional modules in an integrated physical device. For ease of description, the management server and the controller are separately described as two physical devices in embodiments of this application.

It may be understood that the foregoing scenarios are merely examples in embodiments of this application, and embodiments of this application are not limited to these scenarios.

With reference to the accompanying drawings, the following describes in detail specific implementations of the service processing method in embodiments of this application by using embodiments.

It should be noted that an application in embodiments of this application is specifically an application program installed on user equipment, and a service server corresponding to the application program in a data center provides a corresponding service for the application.

A network device in embodiments of this application may be a network device such as a router or a switch. A CE device connected to the network device may be user equipment, or may be a service server on a data center side. In embodiments of this application, a network device and a node represent a same meaning, and may be replaced.

It should be noted that, in embodiments of this application, for an SRv6 scenario, the segment list is a list including SIDs, and each SID is a 128-bit internet protocol version 6 (IPv6) address; and for an SR MPLS scenario, the segment list is a list including MPLS labels.

Figure 5:
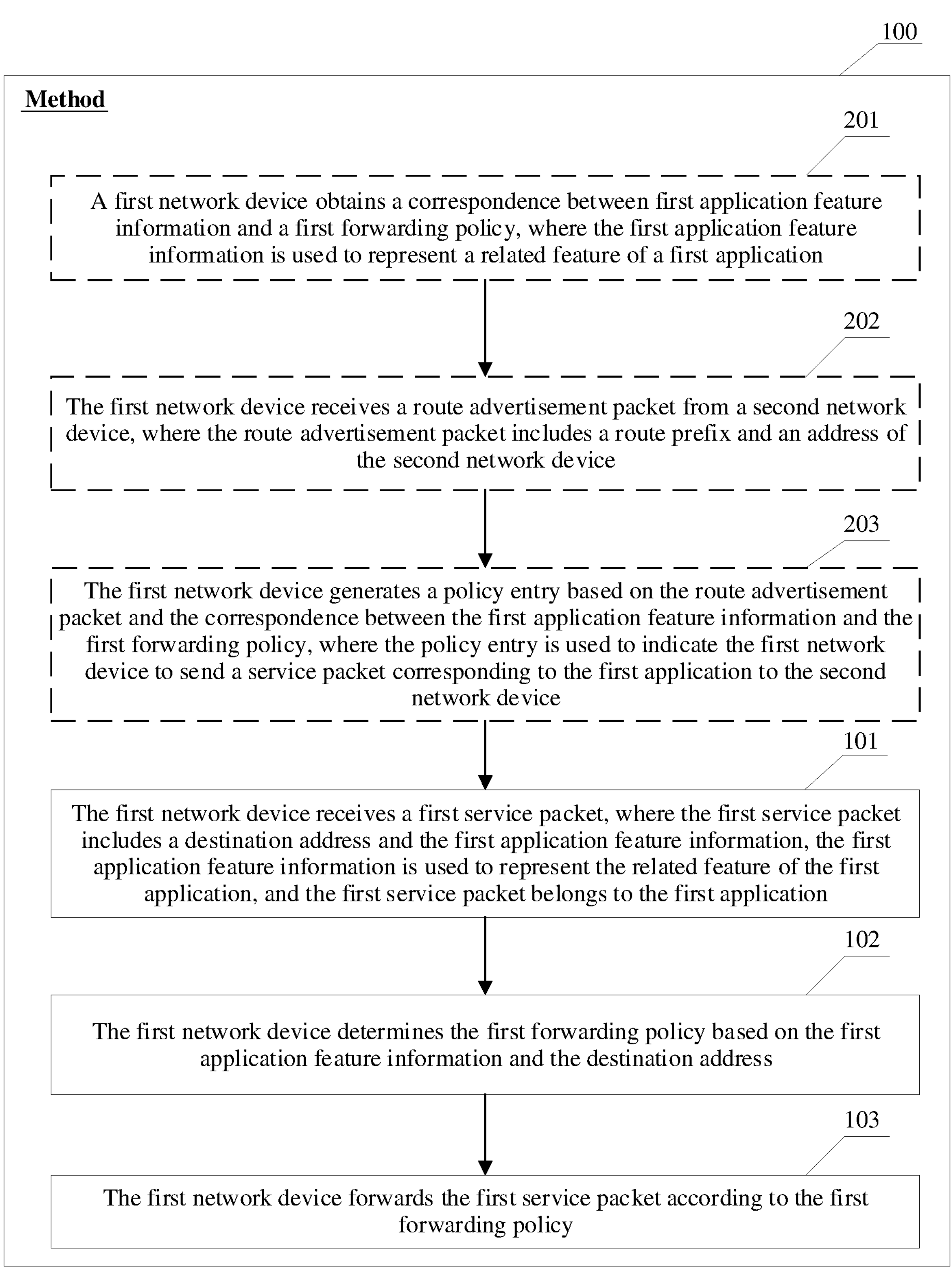
FIG. 5 is a schematic flowchart of a service processing method 100 according to an embodiment of this application.

FIG. 5 is a schematic flowchart of a service processing method 100 according to an embodiment of this application. Refer to FIG. 5. The method 100 is implemented by a first network device, and the first network device may be specifically the PE device 11 or the PE12 shown in FIG. 2. In this embodiment of this application, an example in which the first network device is a PE device connected to user equipment (that is, a first CE device) is used for description. Correspondingly, a PE device connected to a service server (that is, a second CE device) that provides a service for an application on the user equipment is denoted as a second network device. During specific implementation, the method 100 may include, for example, the following S101 to S103.

S101: The first network device receives a first service packet, where the first service packet includes a destination address and first application feature information, the first application feature information is used to represent a related feature of a first application, and the first service packet belongs to the first application.

During specific implementation, S101 may be that the first network device receives the first service packet from the first CE device. When a user uses an application on the first CE device, and the first CE device sends a service packet to the first network device, the service packet needs to carry application feature information corresponding to the application. The first service packet is used as an example. The first CE device sends the first service packet to the first network device, where the first service packet belongs to the first application, and the first service packet includes the first application feature information.

To ensure accurate forwarding of the first service packet, before S101, this embodiment of this application may further include the following S201 to S203.

S201: The first network device obtains a correspondence between the first application feature information and a first forwarding policy, where the first application feature information is used to represent a related feature of the first application.

S202: The first network device receives a route advertisement packet from the second network device, where the route advertisement packet includes a route prefix and an address of the second network device.

S203: The first network device generates a policy entry based on the route advertisement packet and the correspondence between the first application feature information and the first forwarding policy, where the policy entry is used to indicate the first network device to send a service packet corresponding to the first application to the second network device.

The policy entry may include at least the correspondence between the first application feature information and the first forwarding policy. The first application feature information is used to represent a related feature of the first application. The first forwarding policy is used to indicate to forward the service packet belonging to the first application from the first network device to the second network device.

The policy entry may include a plurality of correspondences, and each correspondence includes at least application feature information and a forwarding policy. For a specific generation manner of the policy entry and a possible entry format, refer to related descriptions in the following embodiments shown in FIG. 7*a* to FIG. 7*c* and FIG. 8*a* to FIG. 8*c*. It should be noted that, for each application installed on all user equipments connected to the first network device, the first network device obtains, for a network device connected to a service server corresponding to each application, a correspondence between at least two entries, namely, application feature information and a forwarding policy. In this embodiment of this application, an example in which the user equipment is the first CE device and the PE device connected to the service server is the second network device is used for description.

In the policy entry, first application feature information of an application corresponds to the first forwarding policy. The first forwarding policy is a segment identification list (SID List) corresponding to a forwarding path from the first network device to the second network device. The first application feature information includes at least a service level of the application (that is, a service level allocated by the management server to the application). In addition, the first application feature information may further include at least one of the following identifiers: an identifier of the application, an identifier of a user to which the application belongs, or a flow identifier of the application. For details, refer to the description corresponding to FIG. 1.

S202 may be that the first network device receives a first BGP packet sent by the second network device, where the first BGP packet includes an APN6 identifier, the APN6 identifier is used to indicate that the first BGP packet advertises an APN6 route, the APN6 route is used to generate a policy entry, and the APN6 identifier is also used to indicate the first network device to process a service packet from the first network device to the second network device according to an APN6 rule (that is, according to the generated policy entry). In addition to a routing prefix of the second CE device corresponding to the second network device, a virtual private network segment identifier (VPN SID) of the second network device, and the address (Next hop) of the second network device, the first BGP packet may further be extended to carry the APN6 identifier.

A manner in which the first BGP packet carries the APN6 identifier includes but is not limited to the following.

Manner 1: The first BGP packet may carry the APN6 identifier by using an extended address family. For example, a multiprotocol extension for border gateway protocol (MP-BGP) address family is extended, a sub address family identifier (SAFI) is newly defined in an address family whose address family identifier (AFI) is 2, and the SAFI is used to carry the APN6 identifier. An encoding format of network layer reachability information (NLRI) may be the same as an encoding format of a public network IPv6 route.

Manner 2: The first BGP packet may carry the APN6 identifier by using a newly added path attribute. For example, an application-aware ID attribute field about application feature information is newly added to the first BGP packet, and the application-aware ID attribute field is used to carry the APN6 identifier to mark that the first BGP packet advertises an APN6 route.

Manner 3: The first BGP packet may carry the APN6 identifier by using a color field in an extended community attribute. For example, in the first BGP packet, a specific value may be assigned to the color field in the extended community attribute to indicate the APN6 identifier in the first BGP packet, and mark that the first BGP packet advertises an APN6 route.

The first forwarding policy in S201 may be specifically determined by the controller based on the first application feature information, or may be determined by the first network device based on the first application feature information. In a first example, the controller or the first network device may actively determine the first forwarding policy based on the obtained first application feature information. In a second example, the controller or the first network device may implement, based on triggering of the second network device, the operation of determining the first forwarding policy based on the obtained first application feature information. This manner may be referred to as an On Demand Next hop (ODN) manner.

In the first example, if the controller has a path computation capability, after receiving the first application feature information sent by the management server, the controller may compute a forwarding path from the first network device to the second network device based on the first application feature information, and generate the first forwarding policy based on the forwarding path, so that the controller can send the correspondence between the first application feature and the first forwarding policy to the first network device. That the controller sends the mapping relationship between the first application feature and the first forwarding policy to the first network device may be specifically: adding the mapping relationship between the first application feature and the first forwarding policy to a packet of a type such as BGP or a path computation element communication protocol (PCEP), and sending the packet to the first network device.

For example, the first network device receives a second BGP packet sent by the controller, where the second BGP packet includes the correspondence between the first application feature information and the first forwarding policy. The second BGP packet may carry the correspondence between the first application feature information and the first forwarding policy by using an extended type length value (TLV) field in a tunnel encapsulation attribute. FIG. 6*a* shows a newly defined sub-TLV in a tunnel encapsulation attribute field of the second BGP packet. A type type field of the sub-TLV is used to indicate that the sub-TLV is used to carry a mapping relationship between at least one piece of application feature information and a first forwarding policy, a value of a length length field is used to indicate a length of the sub-TLV, and a value value field carries a correspondence between application feature information and a forwarding policy. Specifically, a corresponding quantity of sub-TLVs may be extended in the value field based on a quantity of mapping relationships (that is, an amount of application feature information corresponding to the first forwarding policy). For a format of each sub-sub-TLV, refer to FIG. 6*b*. A sub-sub-TLV corresponding to the first application feature information is used as an example. A type type field is used to indicate that the sub-TLV is used to carry the correspondence between the first application feature information and the first forwarding policy, a value of a length length field is used to indicate a length of the sub-sub-TLV, and a value value field carries the first application feature information. In addition, because a plurality of applications may correspond to one first forwarding policy, the value field may further carry a mask. In FIG. 6*a* and FIG. 6*b*, a reserved field may be further included, and FIG. 6*b* may further include a flag field.

For another example, the first network device receives a first PCEP packet sent by the controller, and the first PCEP packet includes the mapping relationship between the first application feature information and the first forwarding policy. For example, the first PCEP packet may carry the mapping relationship between the first application feature information and the first forwarding policy by using an extended TLV field in a segment routing policy association group (SRPAG) association object. For a specific format of the TLV field carrying the mapping relationship between the first application feature information and the first forwarding policy, refer to the format of the TLV field carrying the correspondence between the first application feature information and the first forwarding policy in the second BGP packet.

For another example, the first network device receives a first border gateway protocol flow specification (BGP FlowSpec) packet sent by the controller, and the first BGP FlowSpec packet includes the correspondence between the first application feature information and the first forwarding policy. A manner in which the first BGP FlowSpec packet carries the correspondence between the first application feature information and the first forwarding policy is not specifically limited in this embodiment of this application.

If the first network device has a path computation capability, after receiving the first application feature information sent by the management server, the controller may add the first application feature information to a packet of a type such as BGP or PCEP and send the packet to the first network device, so that the first network device can compute a forwarding path from the first network device to the second network device based on the first application feature information, and generate the first forwarding policy based on the forwarding path. In this way, the first network device can correspondingly store the first application feature and the first forwarding policy. The forwarding path corresponding to the first forwarding policy is, for example, a path that is in a plurality of forwarding paths from the first network device to the second network device and that meets an SLA requirement in the first application feature information.

In a second example, before S201, if the first network device receives a third BGP packet sent by the second network device, where the third BGP packet includes the first application feature information corresponding to the application, but the first forwarding policy matching the first application feature information is not found in the policy entry of the first network device, it may be considered as one ODN process, that is, the second network device triggers the computation of the path from the first network device to the second network device for the application corresponding to the first application feature information. It should be noted that the third BGP packet and the first BGP packet may be a same BGP packet, or may be two different BGP packets. In the third BGP packet, for example, the first application feature information may be carried by using a newly added application-aware ID attribute field.

If the first network device has the path computation capability, the first network device may compute a forwarding path from the first network device to the second network device based on the first application feature information in the third BGP packet, and generate the first forwarding policy based on the forwarding path. Therefore, the first network device may correspondingly store the first application feature and the first forwarding policy.

Alternatively, the first network device may send a request packet to the controller, where the request packet carries the first application feature information, and is used to request the controller to determine the first forwarding policy from the first network device to the second network device, and indicate to return the correspondence between the first application feature information and the first forwarding policy. The request packet may be a fourth BGP packet, and the fourth BGP packet may carry the first application feature information by using, for example, an extended TLV field in a tunnel encapsulation attribute; or the request packet may be a second PCEP packet, and the second PCEP packet may carry the first application feature information by using an extended TLV field in an SRPAG ASSOCIATION object. In this case, the controller may further send the correspondence between the first application feature information and the first forwarding policy to the first network device by using a packet of a type such as BGP or PCEP.

For S203, after receiving the first BGP packet that carries the APN6 identifier and obtaining the correspondence between the first application feature information and the first forwarding policy, the first network device may correspondingly save the first application feature information and the first forwarding policy in a policy entry according to an indication of the APN6 identifier.

A form of the policy entry is not specifically limited in this embodiment of this application. The following describes several possible forms of the policy entry by using examples.

Form 1: The policy entry may be represented by using a correspondence table (for example, the first policy entry). The first policy entry may include at least a correspondence between a route prefix, the first application feature information, and the first forwarding policy. When receiving the service packet corresponding to the first application, the first network device may determine the first forwarding policy of the service packet by querying the table only once, so as to forward the service packet to the second network device based on the forwarding path corresponding to the first forwarding policy. As shown in FIG. 7*a*, the first policy entry includes an entry 1 and an entry 2. The entry 1 includes a route prefix 1, application feature information 1, and a forwarding policy 1; and the entry 2 includes a route prefix 1, application feature information 2, and a forwarding policy 1.

Form 2: Policy entries may also be grouped based on tail nodes, and each group is referred to as a policy entry group corresponding to the tail node. A policy entry group corresponding to the second network device is used as an example. It may be considered that the policy entry includes the policy entry group corresponding to the second network device. The policy entry group corresponding to the second network device includes multiple policy entries. For example, the policy entry group corresponding to the second network device may include a first policy entry between the first application feature information and the first forwarding policy. If the second network device is also a tail node corresponding to another application, the second policy entry between the second application feature information corresponding to the another application and the second forwarding policy may also be included in the policy entry group corresponding to the second network device.

In an example, for a form of the policy entry shown in the form 2, the policy entry may be presented by using a correspondence table. In the policy entry, the first policy entry in the policy entry group corresponding to the second network device includes a mapping relationship between a route prefix, an identifier of the policy entry group corresponding to the second network device, the first application feature information, and the first forwarding policy. In addition, if the second network device corresponds to second application feature information of another application, and the second application feature information corresponds to a second forwarding policy, in the first policy entry, the identifier of the policy entry group corresponding to the route prefix and the second network may further correspond to the second application feature information and the second forwarding policy. As shown in FIG. 7*b*, the policy entry includes an entry 3 and an entry 4. The entry 3 includes a route prefix 1, an identifier 1 of the policy entry group corresponding to the second network device, application feature information 1, and a forwarding policy 1. The entry 4 includes a route prefix 1, an identifier 1 of the policy entry group corresponding to the second network device, application feature information 2, and a forwarding policy 1.

In another example, for the form of the policy entry shown in the form 2, the policy entry may be represented by using two correspondence tables (that is, the second policy entry and the third policy entry). The policy entry includes a second policy entry (which may also be referred to as an APN6 forwarding table (FIB)) and a third policy entry. The third policy entry includes the correspondence between the first application feature information and the first forwarding policy. The second policy entry includes a correspondence between a route prefix and an identifier of the third policy entry. As shown in FIG. 7*c*, the policy entry includes a policy entry 2 and a policy entry 3. The policy entry 3 includes an entry 5 and an entry 6. The entry 5 includes application feature information 1 and a forwarding policy 1. The entry 6 includes application feature information 2 and a forwarding policy 1. The policy entry 2 includes a route prefix 1 and an identifier 1 of the policy entry 3. The policy entry 3 may be indexed by using the identifier 1 of the policy entry 3.

The second policy entry is a forwarding table used to forward a packet, among service packets, that carries application feature information. For example, a process of generating the second policy entry may include: The first network device receives a route advertisement packet that is sent by the second network device and that includes an APN6 identifier, and the first network device matches a fourth policy entry based on an address of the second network device, where the fourth policy entry includes a correspondence between the address of the second network device and the identifier of the third policy entry. In this case, the first network device may generate the second policy entry based on the fourth policy entry. During specific implementation, after obtaining the correspondence between the first application feature information and the first forwarding policy, and before generating the third policy entry, the first network device group all correspondences based on an obtained correspondence between application feature information and a forwarding policy and a tail node (that is, an endpoint) of the forwarding policy. For example, the endpoint is that all correspondences of the second network device correspond to one third policy entry, and the fourth policy entry corresponding to the third policy entry may include a correspondence between the identifier of the second network device and the identifier of the third policy entry. Subsequently, the first network device receives a fifth BGP packet sent by the second network device, where the fifth BGP packet includes an APN6 identifier, an address of the second network device, and a route prefix. In this case, the first network device may further add an entry, namely, a route prefix and an identifier of the third policy entry, to the second policy entry on a forwarding plane, that is, add the entry on the right side of FIG. 7*c*. It should be noted that the fifth BGP packet, the first BGP packet, and the third BGP packet may be a same BGP packet.

It should be noted that, regardless of a representation form of the policy entry, the policy entry may further include a default policy entry, which is used to guide forwarding of a service packet that does not match a corresponding forwarding policy in a network. The default policy entry may include the default second forwarding policy, or may include a destination node (for example, the identifier of the second network device). For example, refer to default entries shown in FIG. 7*a* to FIG. 7*c*.

In some possible implementations, in the policy entry, each piece of application feature information may correspond to one entry, as shown in FIG. 7*a* to FIG. 7*c*. In this way, a corresponding forwarding policy can be accurately matched for each application.

In some other possible implementations, to save entry resources in a policy entry, a mask mask may be further introduced into the entry. For example, when a plurality of applications are diverted to a same forwarding policy, the management server allocates application feature information of a same service level to the plurality of applications. In this case, in a policy entry, only one entry is required to express a correspondence between application feature information of the plurality of applications and a same forwarding policy. The mask in the entry is used to indicate valid information used for matching in the application feature information. For example, the mask may be used to indicate that a value of an SLA level field in the application feature information is valid. When a service packet is received, it may be considered that the service packet matches the entry provided that a value of the SLA level field in application feature information of the service packet matches the value of the SLA level field in the entry. Therefore, a corresponding forwarding policy may be searched for based on an identifier of the forwarding policy in the entry, and the service packet is forwarded according to the found forwarding policy. For example, SLA levels in both first application feature information and second application feature information that are allocated to a first application and a second application are 3. In this case, for the APN6 forwarding rule, refer to FIG. 8*a*, FIG. 8*b*, or FIG. 8*c*. Compared with FIG. 7*a*, in FIG. 8*a*, a mask is added to each entry, and entries with a same forwarding policy are represented in a form of one entry. Compared with FIG. 7*b*, in FIG. 8*b*, a mask is added to each entry, and entries with a same forwarding policy are represented in a form of one entry. Compared with FIG. 7*c*, in FIG. 8*c*, an entry on the left side is unchanged, a mask is added to an entry on the right side, and entries with a same forwarding policy are represented in a form of one entry.

It should be noted that the mask mask may be specifically a 128-bit character string including 0 and 1, and a corresponding bit participating in matching during application feature information matching is indicated by using a value of the mask. A bit whose mask is 1 is a bit participating in matching in the application feature information, and the bit participating in matching in the application feature information is valid information of the application feature information. In one case, the mask may be a subnet mask, to be specific, the mask includes N consecutive bits whose values are 1 and M consecutive bits whose values are 0 (where N and M are integers). In this case, the subnet mask indicates that corresponding N consecutive bits in the application feature information need to participate in matching. In another case, bits whose values are 1 and 0 in the mask may be discontinuous. For example, the mask may be 1010101100010 . . . . In this case, the mask indicates that a bit whose value is 1 in the application feature information needs to participate in matching.

The first network device obtains the policy entry through the foregoing S201 to S203 to prepare for implementing refined control on the application, so that the service packet corresponding to the application can be subsequently forwarded according to the first forwarding policy, meeting a network performance requirement of the application, in the policy entry.

S102: The first network device determines a first forwarding policy based on the first application feature information and the destination address.

After S101, the method 100 may further include: The first network device obtains the first application feature information and the destination address by parsing the first service packet, and searches policy entries for a corresponding policy entry based on the first application feature information and the destination address to use the forwarding policy in the hit policy entry as the first forwarding policy to perform the following S103.

In an example, for the first policy entry shown in FIG. 7*a*, for example, S102 may include: The first network determines, from the first policy entry, the entry 1 that matches the destination address of the first service packet and the first application feature information carried in the first service packet, where the entry 1 includes the route prefix 1 matching the destination address of the first service packet; and then, the first network device denotes a forwarding policy 1 in the entry 1 as the first forwarding policy.

For the first policy entry shown in FIG. 8*a*, for example, S102 may include: The first network device determines, from the first policy entry, that the route prefix 1 in the entry 1 matches the destination address of the first service packet; then, the first network device determines whether the valid information of the first application feature information indicated by the mask in the entry 1 matches the information corresponding to the first application feature information in the first service packet; and if the valid information matches the information corresponding to the first application feature information, the first network device denotes the forwarding policy 1 in the entry 1 as the first forwarding policy.

In another example, for the policy entry shown in FIG. 7*b*, for example, S102 may include: The first network device determines, from the policy entry, that the route prefix 1 matches the destination address of the first service packet; and then, the first network device determines, from the entry 3 and the entry 4 that correspond to the identifier 1 of the matched policy entry group, the entry 3 matching the first application feature information in the first service packet, that is, determines that the application feature information 1 of the entry 3 matches the first application feature information in the first service packet, so that the first network device denotes the forwarding policy 1 in the entry 3 as the first forwarding policy.

For the policy entry shown in FIG. 8*b*, for example, S102 may include: The first network device determines, from the policy entries, a policy entry group indicated by an identifier 1 of a policy entry group matching the destination address of the first service packet; and then, the first network device determines, from the entries in the policy entry group, that the valid information indicated by the mask in the application feature information 1 matches the valid information corresponding to the first application feature information in the first service packet, so that the first network device denotes the forwarding policy 1 in the entry 3 to which the application feature information 1 belongs as the first forwarding policy.

In still another example, for the policy entry shown in FIG. 7*c*, for example, S102 may include: The first network device determines, from the policy entry 2, that the route prefix 1 matches the destination address of the first service packet; then obtains the identifier 1 of the policy entry 3 from the policy entry 2; and determines the policy entry 3 based on the identifier 1 of the policy entry 3 to search the policy entry 3 for an entry in which the application feature information matches the first application feature information in the first service packet. Therefore, the first network device denotes the forwarding policy 1 in the hit entry 5 as the first forwarding policy.

For the policy entry shown in FIG. 8*c*, for example, S102 may include: The first network device determines, from the policy entry 2, that the route prefix 1 matches the destination address of the first service packet; then obtains the identifier 1 of the policy entry 3 from the policy entry 2; and determines the policy entry 3 based on the identifier 1 of the policy entry 3 to search the policy entry 3 for an entry matching the valid information of the application feature information indicated by the mask and the valid information corresponding to the first application feature information in the first service packet. Then, the first network device denotes the forwarding policy 1 in the hit entry as the first forwarding policy.

In this way, the first network device is prepared to effectively and accurately forward the first service packet as required.

S103: The first network device forwards the first service packet according to the first forwarding policy.

During specific implementation, the first network device may encapsulate the first forwarding policy into the first service packet to indicate to forward the first service packet from the first network device to the second network device. For example, in an SRv6 scenario, a segment routing header (SRH) may be encapsulated in the first service packet, and the SRH carries the first forwarding policy. In one case, the SRH may carry an identifier of a nexthop corresponding to each node on the forwarding path from the first network device to the second network device. In this way, each node needs to forward the first service packet strictly based on the nexthop specified by the SRH. In another case, the SRH may further carry a VPN SID of the second network device and binding segment identifiers (BSID) of some nodes on the forwarding path from the first network device to the second network device. In this way, if no path is specified between a node and a nexthop, a path to the nexthop may be computed in an interior gateway protocol (IGP) shortest path manner, provided that the first service packet is forwarded to the second network device through the node specified by the SRH.

A forwarding policy in a policy entry is specifically an identifier of the forwarding policy, and the identifier of the forwarding policy can uniquely find a plurality of forwarding policies stored on the first network device. The identifier of the forwarding policy may include, for example, an identifier of a head network device, an identifier of a tail network device, and a color value corresponding to the application. For example, the identifier of the first forwarding policy may include an identifier of the first network device, an identifier of the second network device, and a color value corresponding to the application.

It can be learned that, by using the method 100, the first network device obtains the policy entry, where the policy entry includes the mapping relationship between the first application feature information used to represent the related feature of the first application and the first forwarding policy used to indicate to forward a service packet belonging to the first application from the first network device to the second network device. Then, if the first network device receives the first service packet belonging to the first application, and the first service packet includes the first application feature information, the first network device may forward the first service packet according to the first forwarding policy. In this way, provided that a service packet carries application feature information, a network device can sense a specific application corresponding to the service packet, and accurately divert the service packet according to a forwarding policy corresponding to the application feature information of the application to meet a network performance requirement of the application, so that it is possible to provide application-level service processing for a user, thereby improving user experience.

It should be noted that S201 to S203 may be implemented as an independent packet processing method, or may be implemented as a whole with reference to S101 to S103. This is not limited in this embodiment of this application. S101 to S103 may be implemented as an independent packet processing method, or may be implemented as a whole with reference to S201 to S203. This is not limited in this embodiment of this application.

In some possible implementations, for a default forwarding entry, this embodiment of this application may further include: The first network device receives a second service packet, where the second service packet includes second application feature information. In this case, the first network device determines that the second application feature information carried in the second service packet does not match the application feature information in the policy entry, selects the default policy entry in the policy entries, and considers the default policy entry as the entry, matching the second application feature information, in the policy entries. Therefore, the first network device forwards the second service packet according to the default policy entry.

In an example, the default policy entry may include a second forwarding policy. Therefore, that the first network device forwards the second service packet based on the default policy entry specifically means that the first network device forwards the second service packet according to the second forwarding policy.

In another example, the default policy entry may further include an identifier of the second network device. In this case, the default policy entry may be considered as a best effort (BE) forwarding policy. In this case, that the first network device forwards the second service packet according to the default policy entry may specifically include: The first network device computes a path from the first network device to the second network device, and forwards the second service packet based on path information corresponding to the path.

In this way, even if the application feature information in the service packet received by the first network device does not hit an entry in the policy entry, forwarding of a service packet may be effectively guided according to the preset default policy entry, so that the service packet processing method is more perfect.

Figure 9:
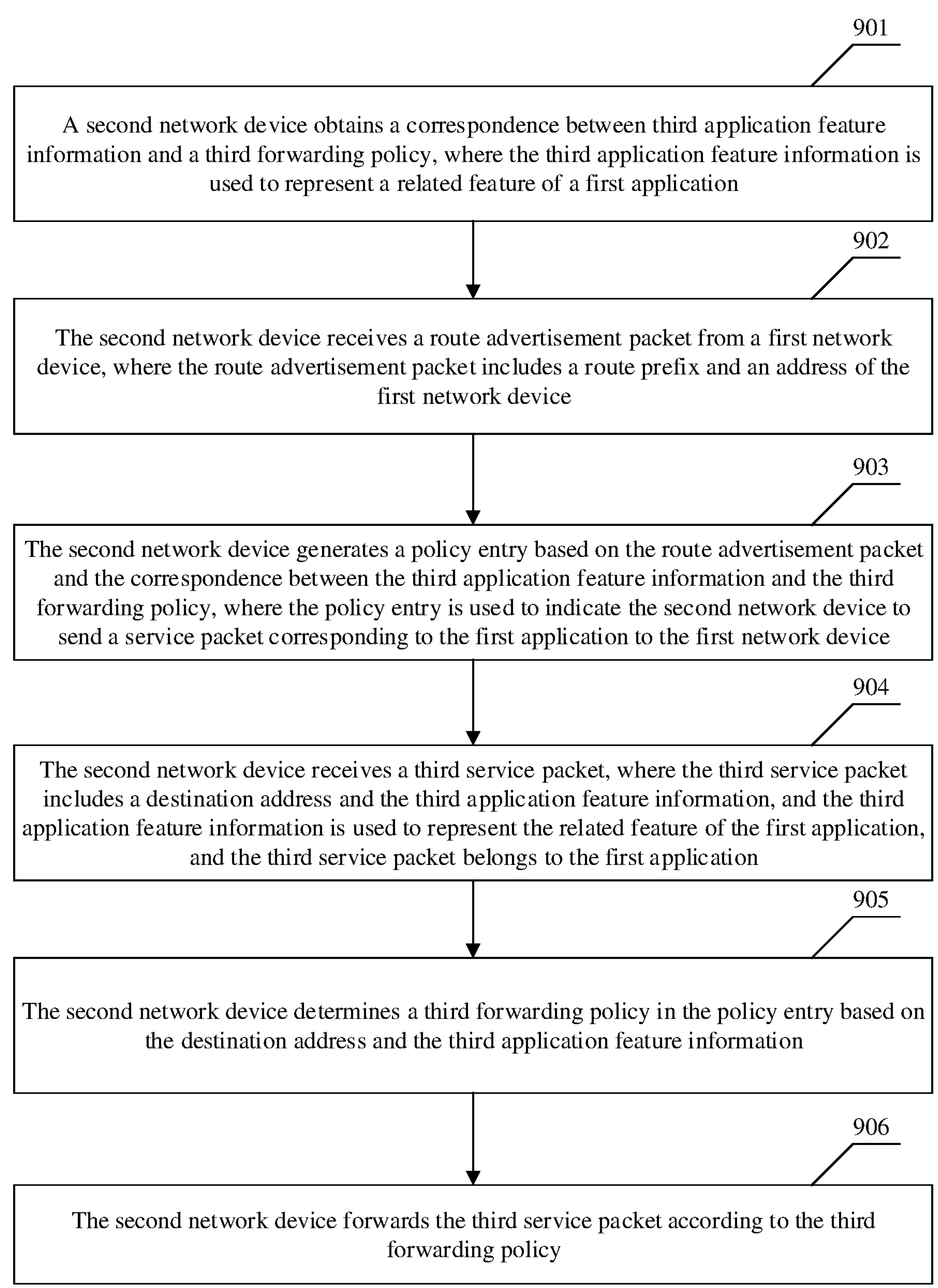
FIG. 9 is a schematic flowchart of another service processing method according to an embodiment of this application.

It should be noted that the foregoing method 100 is described by using a process of processing a service packet from user equipment to a service server side as an example. Similarly, the network architecture to which the method 100 shown in FIG. 5 is applicable is still used as an example. As shown in FIG. 9, the process of processing a service packet from the service server to the user equipment may include, for example, the following steps.

S901: A second network device obtains a correspondence between third application feature information and a third forwarding policy, where the third application feature information is used to represent a related feature of a first application.

S902: The second network device receives a route advertisement packet from a first network device, where the route advertisement packet includes a route prefix and an address of the first network device.

S903: The second network device generates a policy entry based on the route advertisement packet and the correspondence between the third application feature information and the third forwarding policy, where the policy entry is used to indicate the second network device to send a service packet corresponding to the first application to the first network device.

S904: The second network device receives a third service packet, where the third service packet includes a destination address and the third application feature information, and the third application feature information is used to represent the related feature of the first application, and the third service packet belongs to the first application.

S905: The second network device determines a third forwarding policy in the policy entry based on the destination address and the third application feature information.

S906: The second network device forwards the third service packet according to the third forwarding policy.

It should be noted that, for terms, specific implementations, and achieved effects in S901 to S903, refer to the related descriptions of S201 to S203 in the method 100. For terms, specific implementations, and achieved effects in S904 to S906, refer to the related descriptions of S101 to S103 in the method 100.

It should be noted that, in the method 100, if in an applicable network, the first CE device is a service server, the second CE device is user equipment, the first network device is a network-side PE device, and the second network device is a user-side PE device, the method is essentially the same as the method shown in FIG. 9, and only a different expression manner is used.

Figure 10:
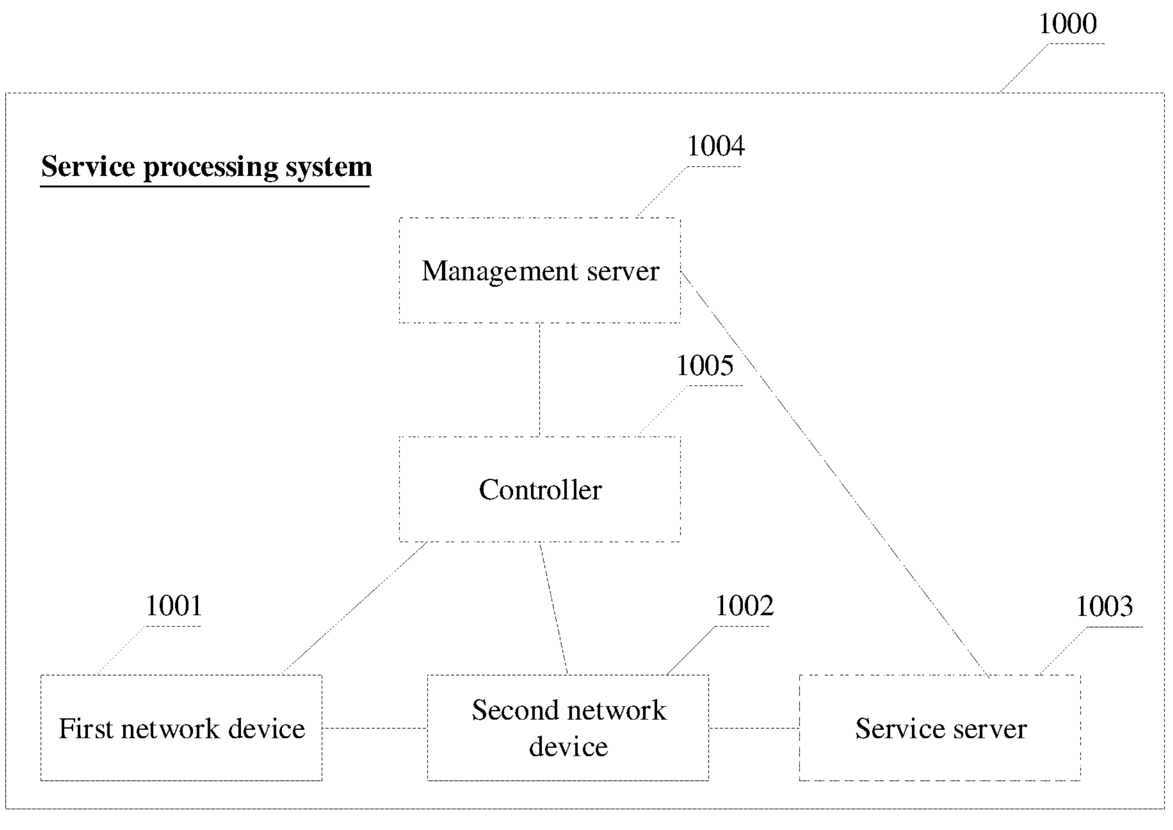
FIG. 10 is a schematic diagram of a structure of a service processing system 1000 according to an embodiment of this application.

Correspondingly, an embodiment of this application further provides a service processing system 1000, as shown in FIG. 10. The service processing system 1000 includes a first network device 1001 and a second network device 1002. The first network device 1001 is configured to receive a service packet including a destination address and application feature information, where the application feature information is used to represent a related feature of an application, and the service packet belongs to the application. The first network device 1001 is further configured to: determine a forwarding policy based on the destination address and the application feature information, and forward the service packet to the second network device 1002 according to the forwarding policy. The second network device 1002 is configured to: receive the service packet, and send the service packet to a destination device corresponding to the destination address.

In some possible implementations, the service processing system 1000 may further include a service server 1003 and a management server 1004. The service server 1003 is configured to send a request packet to the management server 1004, where the request packet includes an application identifier and a service level requirement. The management server 1004 is configured to: receive the request packet sent by the service server 1003, allocate, to an application corresponding to the application identifier, a service level meeting the service level requirement, generate the application feature information, and send the application feature information to the service server 1003, where the application feature information includes the allocated service level. In this case, the service server 1003 is further configured to send the application feature information to user equipment.

In an example, the service processing system 1000 may further include a controller 1005. The management server 1004 is further configured to send the application feature information to the controller 1005. In this case, the controller 1005 is configured to: generate the forwarding policy based on the application feature information, and send a correspondence between the application feature information and the forwarding policy to the first network device 1001.

In another example, the service processing system 1000 may further include a controller 1005. The management server 1004 is further configured to send the application feature information to the controller 1005. The controller 1005 is configured to: receive the application feature information, and send the application feature information to the first network device 1001. The first network device 1001 is further configured to: generate the forwarding policy based on the application feature information, and correspondingly save the application feature information and the forwarding policy.

It should be noted that, for a specific implementation and an effect achieved by the service processing system 1000, refer to the related descriptions in the method 100 and the method 200.

Figure 11:
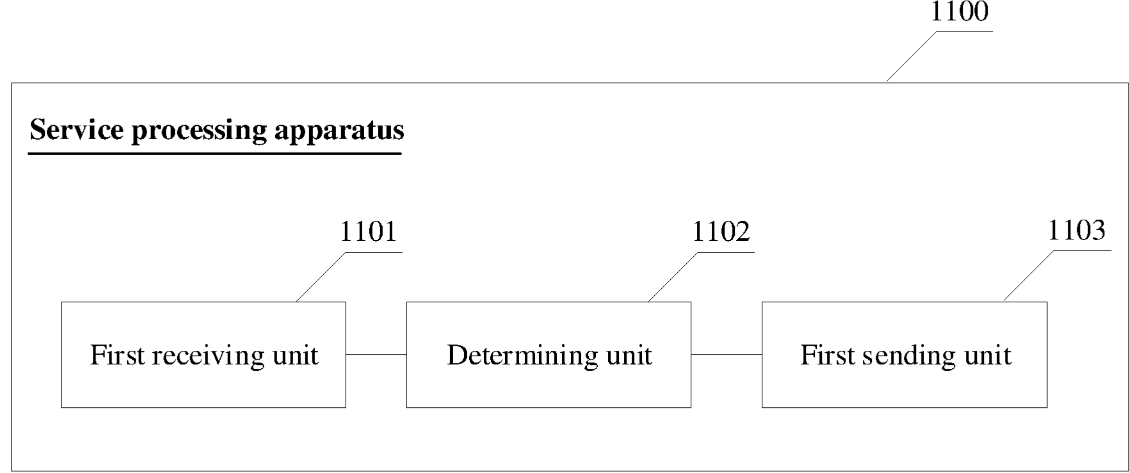
FIG. 11 is a schematic diagram of a structure of a service processing apparatus 1100 according to an embodiment of this application.

In addition, an embodiment of this application further provides a service processing apparatus 1100, as shown in FIG. 11. The service processing apparatus 1100 is applied to a first network device. The apparatus 1100 includes: a first receiving unit 1101, a determining unit 1102, and a first sending unit 1103. The first receiving unit 1101 is configured to receive a first service packet, where the first service packet includes a destination address and first application feature information, the first application feature information is used to represent a related feature of a first application, and the first service packet belongs to the first application. The determining unit 1102 is configured to determine a first forwarding policy based on the destination address and the first application feature information. The first sending unit 1103 is configured to forward the first service packet according to the first forwarding policy.

In some possible implementations, the first network device stores a first policy entry. The first policy entry includes a correspondence between a route prefix, the first application feature information, and the first forwarding policy. The determining unit 1102 is specifically configured to: determine that the destination address in the first service packet matches the route prefix in the first policy entry and the first application feature information in the first service packet matches the first application feature information in the first policy entry, and obtain the first forwarding policy from the first policy entry.

In some other possible implementations, the first network device stores a second policy entry and a third policy entry. The second policy entry stores a correspondence between a route prefix and an identifier of the third policy entry. The third policy entry stores a correspondence between the first application feature information and the first forwarding policy. The determining unit 1102 is specifically configured to: determine that the destination address in the first service packet matches the route prefix in the second policy entry; determine the third policy entry based on the identifier of the third policy entry included in the second policy entry; and determine that application feature information in the third policy entry matches application feature information included in the first service packet, and obtain the first forwarding policy from the third policy entry.

In some possible implementations, the apparatus 1100 further includes a second receiving unit, a matching unit, and a first generation unit. The second receiving unit is configured to receive a route advertisement packet sent by a second network device, where the route advertisement packet includes the route prefix and an address of the second network device. The matching unit is configured to match a fourth policy entry based on the address of the second network device, where the fourth policy entry includes a correspondence between the address of the second network device and the identifier of the third policy entry. The first generation unit is configured to generate the second policy entry based on the fourth policy entry. The route advertisement packet is a first border gateway protocol BGP packet. The first BGP packet may further include an APN6 identifier. The APN6 identifier is used to indicate to process a service packet from the first network device to the second network device according to an APN6 rule. The first BGP packet carries the APN6 identifier by using an extended address family, or the first BGP packet carries the APN6 identifier by using a newly added path attribute, or the first BGP packet carries the APN6 identifier by using a color field in an extended community attribute.

In some possible implementations, the apparatus 1100 further includes a computation unit and a second generation unit. The computation unit is configured to compute a forwarding path from the first network device to the second network device based on the first application feature information. The second generation unit is configured to generate the first forwarding policy based on the forwarding path.

In some possible implementations, the apparatus 1100 further includes a third receiving unit. The third receiving unit is configured to receive the first forwarding policy sent by a controller.

In an example, the third receiving unit is specifically configured to receive a BGP packet sent by the controller, where the second BGP packet carries the first forwarding policy by using an extended type length value TLV field in a tunnel encapsulation attribute tunnel encapsulation attribute.

In another example, the third receiving unit is specifically configured to receive a first path computation element protocol PCEP packet sent by the controller, where the first PCEP packet carries the first forwarding policy by using an extended TLV field in a segment routing policy association group association object SRPAG ASSOCIATION object.

In some possible implementations, the apparatus 1100 further includes a second sending unit. The second sending unit is configured to: send a request packet to the controller before the first forwarding policy sent by the controller is received, where the request packet includes the first application feature information, and the request packet is used to request the controller to determine the first forwarding policy from the first network device to the second network device. The request packet may be a third BGP packet, and the third BGP packet carries the first application feature information by using an extended type length value TLV field in a tunnel encapsulation attribute; or the request packet may be a second PCEP packet, and the second PCEP packet carries the first application feature information by using an extended TLV field in an SRPAG ASSOCIATION object.

The second sending unit may be specifically configured to send the request packet to the controller if it is determined that no first forwarding policy matching first application feature information in the received route advertisement packet exists, where the route advertisement packet is a fourth BGP packet, and the fourth BGP packet carries the first application feature information by using a path attribute.

In some possible implementations, the first policy entry includes a mask mask. The mask is used to indicate valid information in the first application feature information. The determining unit 1102 is specifically configured to determine that information specified by the mask in the first application feature information in the first service packet matches information specified by the mask in the first application feature information in the first policy entry.

In some possible implementations, the third policy entry includes a mask mask. The mask is used to indicate valid information in the first application feature information. The determining unit 1102 is specifically configured to determine that information specified by the mask in the first application feature information in the first service packet matches information specified by the mask in the first application feature information in the third policy entry.

The mask may include a subnet mask.

In some possible implementations, the apparatus 1100 further includes a fourth receiving unit and a third sending unit. The fourth receiving unit is configured to receive a second service packet, where the second service packet includes a destination address and second application feature information, the second application feature information is used to represent a related feature of a second application, and the second service packet belongs to the second application. The third sending unit is configured to forward the second service packet according to a default policy entry if no forwarding policy is matched based on the destination address and the second application feature information.

In an example, the third sending unit is specifically configured to forward the second service packet according to a second forwarding policy when the default policy entry includes the second forwarding policy; or the third sending unit is specifically configured to: when the default policy entry includes an identifier of the second network device, compute a path to the second network device, and forward the second service packet based on path information corresponding to the path.

It should be noted that the service processing apparatus 1100 corresponds to an operation performed by the first network device in the foregoing method 100. For a specific implementation and an achieved effect, refer to the related descriptions in the method 100.

Figure 12:
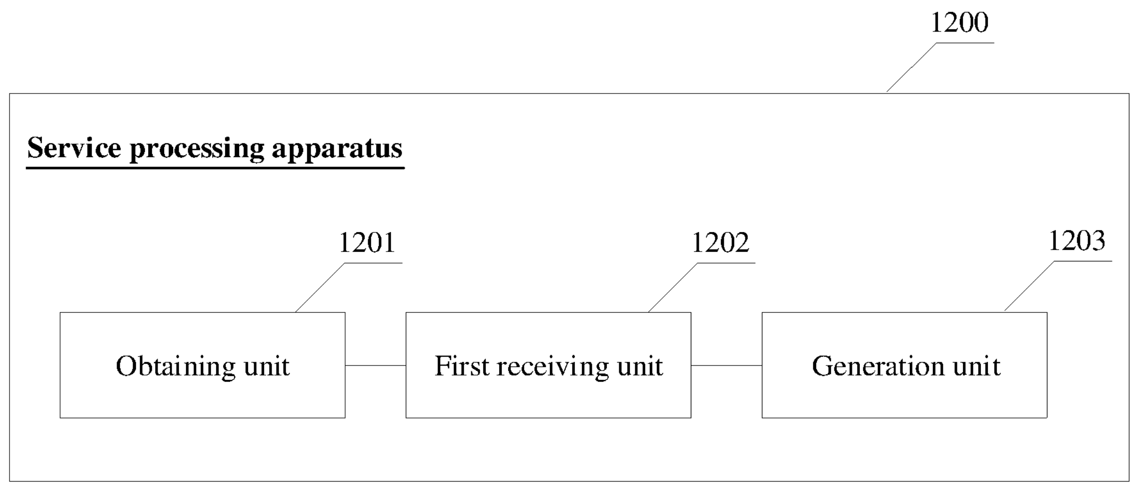
FIG. 12 is a schematic diagram of a structure of another service processing apparatus 1200 according to an embodiment of this application.

In addition, an embodiment of this application further provides a service processing apparatus 1200, as shown in FIG. 12. The service processing apparatus 1200 is applied to a first network device. The apparatus 1200 includes: an obtaining unit 1201, a first receiving unit 1202, and a generating unit 1203. The obtaining unit 1201 is configured to obtain a correspondence between application feature information and a forwarding policy, where the application feature information is used to represent a related feature of an application. The first receiving unit 1202 is configured to receive a route advertisement packet from a second network device, where the route advertisement packet includes a route prefix and an address of the second network device. The generation unit 1203 is configured to generate a policy entry based on the route advertisement packet and the correspondence between the application feature information and the forwarding policy, where the policy entry is used to indicate the first network device to send a service packet corresponding to the application to the second network device.

In some possible implementations, the generation unit 1203 is specifically configured to generate a first policy entry based on the route advertisement packet and the correspondence between the application feature information and the forwarding policy, where the first policy entry includes the correspondence between the route prefix, the application feature information, and the forwarding policy.

In an example, the apparatus 1200 further includes: a second receiving unit, a first matching unit, and a first sending unit. The second receiving unit is configured to receive the service packet, where the service packet includes a destination address and application feature information, and the service packet belongs to the application. The first matching unit is configured to determine that the destination address in the service packet matches the route prefix in the first policy entry and the application feature information in the service packet matches the application feature information in the first policy entry. The first sending unit is configured to forward the service packet according to the forwarding policy in the first policy entry.

In some possible implementations, the policy entry includes a second policy entry and a third policy entry. The generation unit 1203 is specifically configured to: generate the third policy entry, where the third policy entry stores the correspondence between the application feature information and the forwarding policy; and match a fourth policy entry based on the address of the second network device, and generate the second policy entry based on the fourth policy entry, where the fourth policy entry includes a correspondence between the address of the second network device and an identifier of the third policy entry, and the second policy entry stores a correspondence between the route prefix and the identifier of the third policy entry.

In an example, the apparatus 1200 further includes: a third receiving unit, a second matching unit, a determining unit, a third matching unit, and a second sending unit. The third receiving unit is configured to receive the service packet, where the service packet includes a destination address and application feature information, and the service packet belongs to the application. The second matching unit is configured to determine that the destination address in the service packet matches the route prefix in the second policy entry. The determining unit is configured to determine the third policy entry based on the identifier of the third policy entry included in the second policy entry. The third matching unit is configured to determine that the application feature information in the third policy entry matches the application feature information included in the service packet. The second sending unit is configured to forward the service packet according to the forwarding policy in the third policy entry.

It should be noted that the service processing apparatus 1200 corresponds to an operation performed by the first network device in the foregoing method 100. For a specific implementation and an achieved effect, refer to the related descriptions in the method 100. For details, refer to the related descriptions of S201 to S203 in the method 100.

Figure 13:
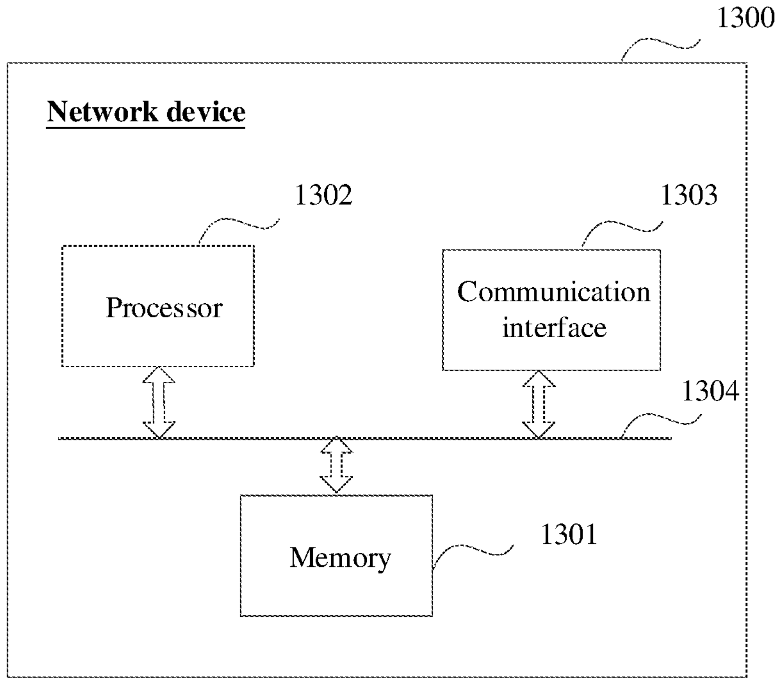
FIG. 13 is a schematic diagram of a structure of a network device 1300 according to an embodiment of this application.

In addition, as shown in FIG. 13, an embodiment of this application further provides a network device 1300. The network device 1300 may implement a function of the PE device 11 in the embodiment shown in FIG. 2, or implement a function of the first network device in the method shown in FIG. 5 or FIG. 9. The network device 1300 includes: a memory 1301, a processor 1302, and a communication interface 1303.

The memory 1301 is configured to store a computer program or instructions.

The processor 1302 is configured to invoke the computer program or instructions stored in the memory, so that the network device performs the method implemented by the first network device in the embodiment shown in FIG. 5.

The communication interface 1303 is configured to communicate with another device in the network.

The memory 1301, the processor 1302, and the communication interface 1303 are connected to each other through a bus 1304. The bus 1304 may be a peripheral component interconnect (PCI) bus, an extended industry standard architecture (EISA) bus, or the like. Buses may be classified into an address bus, a data bus, a control bus, and the like. For ease of representation, only one bold line is used to represent the bus in FIG. 13, but this does not mean that there is only one bus or only one type of bus.

In a specific embodiment, the processor 1301 is configured to determine a first forwarding policy based on the destination address and the first application feature information. For a detailed processing process of the processor 1301, refer to S102 in the embodiment shown in FIG. 5. Details are not described herein again.

The communication interface 1303 is configured to: receive a first service packet, and forward the first service packet according to the first forwarding policy. For a specific process, refer to S101 and S103 in the embodiment shown in FIG. 5. Details are not described herein again.

In another specific embodiment, the processor 1301 is configured to generate a policy entry based on the route advertisement packet and a correspondence between the application feature information and the forwarding policy. For a detailed processing process of the processor 1301, refer to S203 in the embodiment shown in FIG. 5. Details are not described herein again.

The communication interface 1303 is configured to: obtain the correspondence between the application feature information and the forwarding policy, and receive the route advertisement packet from a second network device. For a specific process, refer to S201 and S202 in the embodiment shown in FIG. 5. Details are not described herein again.

The memory 1301 may be a random-access memory (RAM), a flash memory, a read-only memory (ROM), an erasable programmable read-only memory (EPROM), an electrically erasable programmable read-only memory (EE- PROM), a register, a hard disk, a removable hard disk, a CD-ROM, or any other form of storage medium known to a person skilled in the art.

The processor 1302 may be, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in embodiments of this application. Alternatively, the processor may be a combination of processors implementing a computing function, for example, a combination of one or more microprocessors, or a combination of the DSP and a microprocessor.

The communication interface 1303 may be, for example, an interface card, and may be an Ethernet interface or an asynchronous transfer mode (ATM) interface.

An embodiment of this application provides a computer-readable storage medium, including instructions. When the instructions are run on a computer, the computer is enabled to perform the foregoing service processing method.

An embodiment of this application further provides a chip. The chip is disposed in a service processing apparatus 1100 or 1200, or a network device 1300, and the chip includes a processor and an interface circuit. The interface circuit is configured to receive code instructions and transmit the code instructions to the processor. The processor is configured to run the code instructions to perform the service processing method implemented by the first network device in the embodiment shown in FIG. 5.

In embodiments of this application, “at least one (item)” means one or more, and “a plurality of” means two or more. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. In this embodiment of this application, it is considered that “A and/or B” includes three cases: only A, only B, and both A and B.

In the specification, claims, and accompanying drawings of embodiments of this application, the terms “first”, “second”, “third”, “fourth”, and so on (if existent) are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. In addition, the terms “include” and “have” and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, unit division is merely logical module division, and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions in embodiments of this application essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a dedicated computer.

The objectives, technical solutions, and beneficial effects of embodiments of this application are further described in detail in the foregoing specific implementations. It should be understood that the foregoing descriptions are merely specific implementations of embodiments of this application.

The foregoing embodiments are merely intended to describe the technical solutions in embodiments of this application, rather than limit this application. Although this application is described in detail with reference to the foregoing embodiments, a person of ordinary skill in the art should understand that modifications can still be made to the technical solutions described in the foregoing embodiments or equivalent replacements can be made to some technical features thereof, without departing from the scope of the technical solutions of embodiments of this application.

What is claimed is:

1. A service processing method, comprising:

receiving, by a first network device, a first service packet, wherein the first service packet comprises a destination address and first application feature information, the first application feature information represents a related feature of a first application, and the first service packet belongs to the first application;

determining, by the first network device, a first forwarding policy based on the destination address and the first application feature information; and forwarding, by the first network device, the first service packet according to the first forwarding policy, wherein the first network device stores a first policy entry, a second policy entry, and a third policy entry, the first policy entry comprises a correspondence between a route prefix, the first application feature information, and the first forwarding policy, the second policy entry stores a correspondence between a route prefix and an identifier of the third policy entry, the third policy entry stores a correspondence between the first application feature information and the first forwarding policy.

2. The method according to claim 1, wherein determining, by the first network device, the first forwarding policy based on the destination address and the first application feature information comprises:

determining, by the first network device, that the destination address in the first service packet matches the route prefix in the first policy entry;

determining, by the first network device, that the first application feature information in the first service packet matches first application feature information in the first policy entry; and obtaining, by the first network device, the first forwarding policy from the first policy entry.

3. The method according to claim 1, wherein determining, by the first network device, the first forwarding policy based on the destination address and the first application feature information comprises:

determining, by the first network device, that the destination address in the first service packet matches the route prefix in the second policy entry;

determining, by the first network device, the third policy entry based on the identifier of the third policy entry comprised in the second policy entry; and determining, by the first network device, application feature information in the third policy entry matches application feature information comprised in the first service packet; and obtaining the first forwarding policy from the third policy entry.

4. The method according to claim 3, further comprising:

receiving, by the first network device, a route advertisement packet sent by a second network device, wherein the route advertisement packet comprises the route prefix and an address of the second network device;

matching, by the first network device, a fourth policy entry based on the address of the second network device, wherein the fourth policy entry comprises a correspondence between the address of the second network device and the identifier of the third policy entry; and generating, by the first network device, the second policy entry based on the fourth policy entry.

5. The method according to claim 4, wherein the route advertisement packet is a first border gateway protocol (BGP) packet, wherein the first BGP packet carries an application-aware internet protocol version 6 networking (APN6) identifier using one of an extended address family, a newly added path attribute, or a color field in an extended community attribute, and wherein the APN6 identifier indicates to process a service packet from the first network device to the second network device according to an APN6 rule.

6. The method according to claim 1, further comprising:

computing, by the first network device, a forwarding path from the first network device to a second network device based on the first application feature information; and generating, by the first network device, the first forwarding policy based on the forwarding path.

7. The method according to claim 1, further comprising:

receiving, by the first network device, the first forwarding policy sent by a controller.

8. The method according to claim 7, wherein receiving, by the first network device, the first forwarding policy sent by the controller comprises at least one of:

receiving, by the first network device, a second BGP packet sent by the controller, wherein the second BGP packet carries the first forwarding policy using a tunnel encapsulation attribute; or receiving, by the first network device, a first path computation element protocol (PCEP) packet sent by the controller, wherein the first PCEP packet carries the first forwarding policy using a segment routing policy association group (SRPAG) association object.

9. The method according to claim 7, wherein the method further comprises, before receiving, by the first network device, the first forwarding policy sent by the controller:

sending, by the first network device, a request packet to the controller, wherein the request packet comprises the first application feature information, and the request packet requests the controller to determine the first forwarding policy from the first network device to a second network device.

10. The method according to claim 9, wherein at least one of:

the request packet is a third BGP packet, and the third BGP packet carries the first application feature information using a tunnel encapsulation attribute; or the request packet is a second PCEP packet, and the second PCEP packet carries the first application feature information using an SRPAG association object.

11. The method according to claim 9, wherein sending, by the first network device, the request packet to the controller comprises:

sending, by the first network device, the request packet to the controller based on it being determined that no first forwarding policy matching first application feature information in a received route advertisement packet exists.

12. The method according to claim 1, further comprising:

receiving, by the first network device, a second service packet, wherein the second service packet comprises a destination address and second application feature information, the second application feature information represents a related feature of a second application, and the second service packet belongs to the second application;

matching, by the first network device, no forwarding policy based on the destination address and the second application feature information; and forwarding, by the first network device, the second service packet according to a default policy entry.

13. The method according to claim 12, wherein based on the default policy entry comprising an identifier of a second network device, forwarding, by the first network device, the second service packet according to the default policy entry comprises:

computing, by the first network device, a path to the second network device; and forwarding, by the first network device, the second service packet based on path information corresponding to the path.

14. The method according to claim 1, wherein the first forwarding policy comprises a segment identifier list (SID) list corresponding to a forwarding path.

15. The method according to claim 1, wherein the first application feature information comprises at least one of a service level of the first application, an identifier of the first application, an identifier of a user or a user group to which the first application belongs, or a flow identifier of the first application.

16. A service processing system, comprising:

a first network device configured to:

receive a service packet, wherein the service packet comprises a destination address and application feature information, the application feature information represents a related feature of an application, and the service packet belongs to the application;

determine a forwarding policy based on the destination address and the application feature information; and forward the service packet to a second network device according to the forwarding policy; and the second network device, configured to:

receive the service packet; and send the service packet to a destination device corresponding to the destination address, wherein the first network device stores a first policy entry, a second policy entry, and a third policy entry, the first policy entry comprises a correspondence between a route prefix, the application feature information, and the forwarding policy, the second policy entry stores a correspondence between a route prefix and an identifier of the third policy entry, the third policy entry stores a correspondence between the application feature information and the forwarding policy.

17. The system according to claim 16, further comprising:

a service server configured to send a request packet to a management server, wherein the request packet comprises an application identifier and a service level requirement; and the management server is configured to:

receive the request packet sent by the service server;

allocate a service level meeting the service level requirement to an application corresponding to the application identifier;

generate the application feature information; and send the application feature information to the service server, wherein the application feature information comprises the allocated service level, wherein the service server is further configured to send the application feature information to user equipment.

18. The system according to claim 17, wherein the system further comprises a controller, wherein the management server is further configured to send the application feature information to the controller, and wherein the controller is configured to:

generate the forwarding policy based on the application feature information; and send the correspondence between the application feature information and the forwarding policy to the first network device.

19. The system according to claim 17, wherein the system further comprises a controller, the management server is further configured to send the application feature information to the controller, and wherein the controller is configured to:

receive the application feature information; and send the application feature information to the first network device; and wherein the first network device is further configured to:

generate the forwarding policy based on the application feature information; and correspondingly save the application feature information and the forwarding policy.

20. A network device, comprising:

a processor; and a non-transitory computer-readable storage medium storing a program to be executed by the processor, the program including instructions for:

receiving, by a first network device, a first service packet, wherein the first service packet comprises a destination address and first application feature information, the first application feature information represents a related feature of a first application, and the first service packet belongs to the first application;

determining, by the first network device, a first forwarding policy based on the destination address and the first application feature information; and forwarding, by the first network device, the first service packet according to the first forwarding policy, wherein the first network device stores a first policy entry, a second policy entry, and a third policy entry, the first policy entry comprises a correspondence between a route prefix, the first application feature information, and the first forwarding policy, the second policy entry stores a correspondence between a route prefix and an identifier of the third policy entry, the third policy entry stores a correspondence between the first application feature information and the first forwarding policy.

* * * * *